US012603936B2

(12) United States Patent
Chatterjee et al.

(10) Patent No.: US 12,603,936 B2
(45) Date of Patent: Apr. 14, 2026

(54) EFFICIENT ITERATIVE COLLECTIVE OPERATIONS USING A NETWORK-ATTACHED MEMORY

(71) Applicant: Hewlett Packard Enterprise Development LP, Spring, TX (US)

(72) Inventors: Soumitra Chatterjee, Karnataka (IN); Chinmay Ghosh, Karnataka (IN); Mashood Abdulla Kodavanji, Karnataka (IN); Sharad Singhal, Belmont, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 137 days.

(21) Appl. No.: 18/409,593

(22) Filed: Jan. 10, 2024

(65) Prior Publication Data

US 2025/0193280 A1 Jun. 12, 2025

(30) Foreign Application Priority Data

Dec. 6, 2023 (IN) .............................. 202341083344

(51) Int. Cl.
*G06F 15/173* (2006.01)
*G06F 12/02* (2006.01)
*H04L 67/1097* (2022.01)

(52) U.S. Cl.
CPC ...... *H04L 67/1097* (2013.01); *G06F 12/0238* (2013.01)

(58) Field of Classification Search
CPC .................................................. H04L 67/1097
See application file for complete search history.

(56) References Cited

U.S. PATENT DOCUMENTS

| | | | | |
|---|---|---|---|---|
| 2004/0098509 A1* | 5/2004 | Alfano | ..................... | H04L 47/34 |
| | | | | 709/249 |
| 2014/0195846 A1* | 7/2014 | Resch | .................... | G06F 3/0629 |
| | | | | 714/6.22 |
| 2019/0045003 A1* | 2/2019 | Archer | ................ | H04L 67/5651 |

(Continued)

OTHER PUBLICATIONS

"The Message Passing Interface (MPI) standard", available online at <qmcs.anl.gov/research/projects/mpi/>, Retrieved on Jun. 1, 2023, 2 pages.

(Continued)

*Primary Examiner* — Yves Dalencourt
(74) *Attorney, Agent, or Firm* — Yao Legal Services, Inc.

(57) ABSTRACT

A system receives a first request to perform a collective operation. The system stores a mapping of a first virtual address to a descriptor for a physical location of an allocated memory region. The system performs the collective operation, by writing data to a first segment of the memory region and accessing data from other segments of the memory region. The system receives a second request to perform an update operation, the second request indicating the first virtual address, one or more portions of a memory region segment to be updated, and corresponding data units to write to the portions. The system updates, based on the mapping, only the indicated portions by writing the corresponding data units. The system performs a subsequent iteration of the collective operation, based on the mapping, by bypassing writing any data to the memory region and only accessing data units from the memory region.

18 Claims, 12 Drawing Sheets

(56) References Cited

U.S. PATENT DOCUMENTS

2019/0082009 A1* 3/2019 Gupta ..................... G06F 3/067
2022/0413741 A1 12/2022 Livis et al.

OTHER PUBLICATIONS

Ahn et al., "PIM-Enabled Instructions: A Low-Overhead, Locality-Aware Processing-in-Memory Architecture", ISCA'J5, June 1 3-17, 2015, pp. 336-348.
Github, "OpenFAM: A library for programming Fabric-Attached Memory", available online at <https://openfam.github.io/index.html>, 2021, 4 pages.
Gropp, William, Lecture 29: Collective Communication and Computation in MPI downloaded Jun. 5, 2023 (28 pages).
Kang et al., Parallel and Distributed Systems, Improving MPI Collective I/O for High Volume Non-contiguous Requests With Intra-node Aggregation, Nov. 2020 (14 pages).
Mohammad Hasanzadeh Mofrad, "Distributed Sparse Computing and Communication for Big Graph Analytics and Deep Learning", Oct. 30, 2020, 134 pages.
MPI, 4.10. The Info Object downloaded Jun. 5, 2023 (4 pages).
Peng et al., "On the Memory Underutilization: Exploring Disaggregated Memory on HPC Systems", IEEE, 2020, pp. 183-190.

* cited by examiner

( A )

RECEIVE A SECOND REQUEST TO PERFORM AN UPDATE OPERATION, THE SECOND REQUEST INDICATING A SECOND VIRTUAL ADDRESS, ONE OR MORE PORTIONS OF A MEMORY REGION SEGMENT TO BE UPDATED, AND CORRESPONDING DATA UNITS TO WRITE TO THE ONE OR MORE PORTIONS
822

PERFORM A FIRST SEARCH IN THE DATA STRUCTURE FOR A MAPPING OF THE SECOND VIRTUAL ADDRESS
824

IDENTIFY, BASED ON THE FIRST SEARCH, THE MAPPING OF THE FIRST VIRTUAL ADDRESS TO THE DESCRIPTOR IN RESPONSE TO THE SECOND VIRTUAL ADDRESS MATCHING THE FIRST VIRTUAL ADDRESS
826

UPDATE, BASED ON THE IDENTIFIED MAPPING, THE ONE OR MORE PORTIONS OF THE MEMORY REGION SEGMENT BY WRITING THE CORRESPONDING DATA UNITS TO THE ONE OR MORE PORTIONS
828

RECEIVE A THIRD REQUEST TO PERFORM THE COLLECTIVE OPERATION, THE THIRD REQUEST INDICATING A THIRD VIRTUAL ADDRESS
830

PERFORM A SECOND SEARCH IN THE DATA STRUCTURE FOR A MAPPING OF THE THIRD VIRTUAL ADDRESS
832

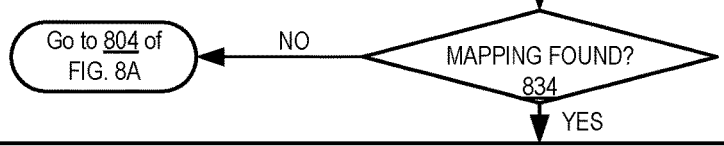

Go to 804 of FIG. 8A ◄── NO ── MAPPING FOUND? 834

YES

IDENTIFY, BASED ON THE SECOND SEARCH, THE MAPPING OF THE FIRST VIRTUAL ADDRESS TO THE DESCRIPTOR IN RESPONSE TO THE THIRD VIRTUAL ADDRESS MATCHING THE FIRST VIRTUAL ADDRESS
836

PERFORM THE COLLECTIVE OPERATION, THE COLLECTIVE OPERATION FURTHER COMPRISING AT LEAST BYPASSING, BASED ON THE IDENTIFIED MAPPING, WRITING ANY DATA TO THE MEMORY REGION AND ONLY ACCESSING DATA UNITS FROM THE MEMORY REGION
838

( RETURN )

FIG. 8B

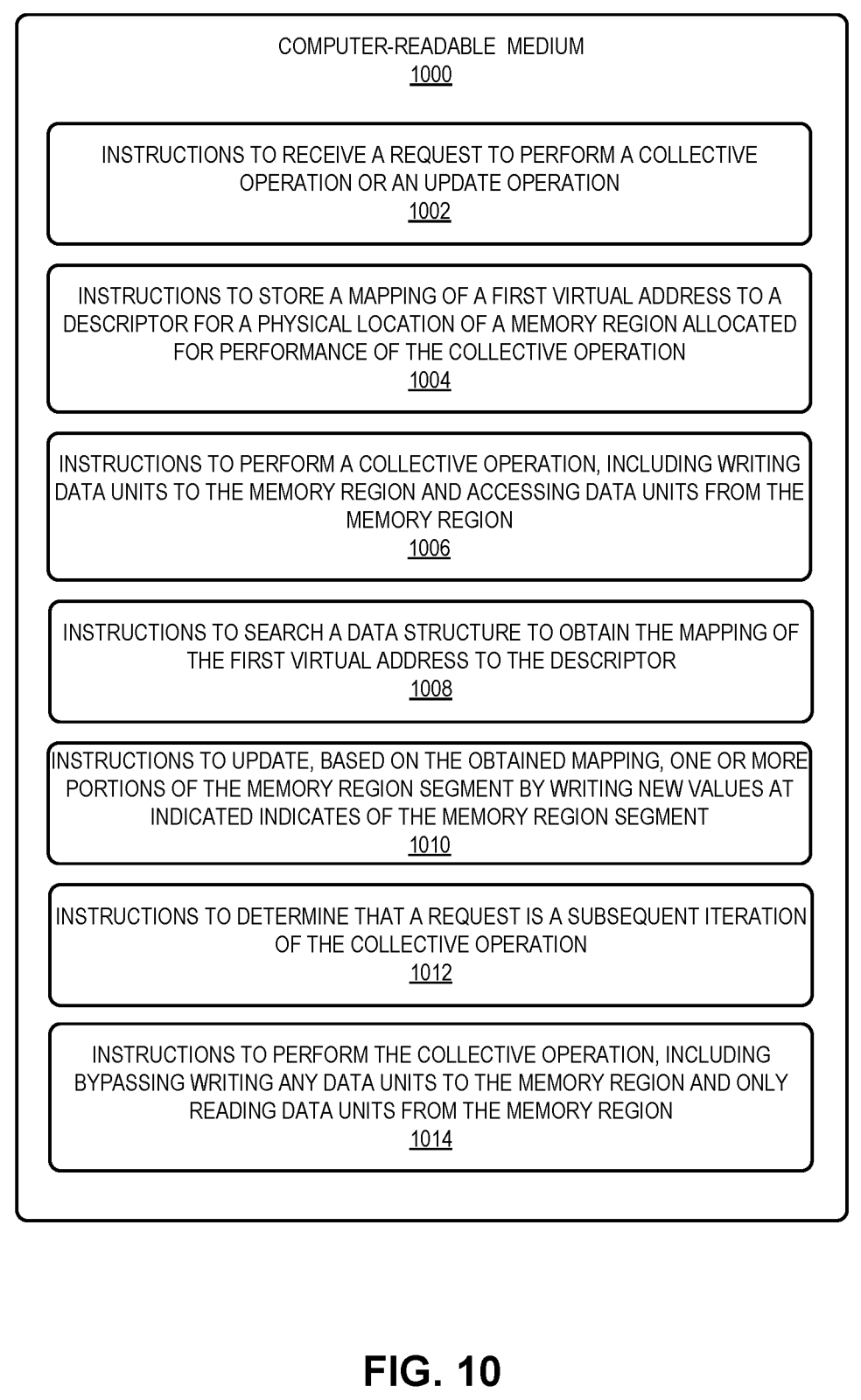

COMPUTER-READABLE MEDIUM
1000

INSTRUCTIONS TO RECEIVE A REQUEST TO PERFORM A COLLECTIVE
OPERATION OR AN UPDATE OPERATION
1002

INSTRUCTIONS TO STORE A MAPPING OF A FIRST VIRTUAL ADDRESS TO A
DESCRIPTOR FOR A PHYSICAL LOCATION OF A MEMORY REGION ALLOCATED
FOR PERFORMANCE OF THE COLLECTIVE OPERATION
1004

INSTRUCTIONS TO PERFORM A COLLECTIVE OPERATION, INCLUDING WRITING
DATA UNITS TO THE MEMORY REGION AND ACCESSING DATA UNITS FROM THE
MEMORY REGION
1006

INSTRUCTIONS TO SEARCH A DATA STRUCTURE TO OBTAIN THE MAPPING OF
THE FIRST VIRTUAL ADDRESS TO THE DESCRIPTOR
1008

INSTRUCTIONS TO UPDATE, BASED ON THE OBTAINED MAPPING, ONE OR MORE
PORTIONS OF THE MEMORY REGION SEGMENT BY WRITING NEW VALUES AT
INDICATED INDICATES OF THE MEMORY REGION SEGMENT
1010

INSTRUCTIONS TO DETERMINE THAT A REQUEST IS A SUBSEQUENT ITERATION
OF THE COLLECTIVE OPERATION
1012

INSTRUCTIONS TO PERFORM THE COLLECTIVE OPERATION, INCLUDING
BYPASSING WRITING ANY DATA UNITS TO THE MEMORY REGION AND ONLY
READING DATA UNITS FROM THE MEMORY REGION
1014

FIG. 10

EFFICIENT ITERATIVE COLLECTIVE OPERATIONS USING A NETWORK-ATTACHED MEMORY

BACKGROUND

Field

Process entities (or "ranks") on multiple computing nodes may perform a collective operation, in which each rank may distribute its portion of data across the ranks or each rank may send its portion of data to one rank which performs computation and returns the result to every other rank. In these use cases, the entire sequence of transfer and compute operations need to be performed, even when only a few data elements are modified (i.e., "sparse modifications") in a sequence of repeated operations. Collective operations with sparse modifications incur the original volume of data transfer, despite only a portion of the data being modified in subsequent operations. Furthermore, in the case of iterative collective operations with sparse modifications, this inefficiency can be compounded, as each iteration also incurs the original volume of data transfer.

BRIEF DESCRIPTION OF THE FIGURES

FIGS. 8A-8B present flowcharts illustrating a method for facilitating efficient iterative collective operations using a network-attached memory, in accordance with an aspect of the present application.

FIG. 10 illustrates a non-transitory computer-readable medium for facilitating efficient iterative collective operations using a network-attached memory, in accordance with an aspect of the present application.

In the figures, like reference numerals refer to the same figure elements.

DETAILED DESCRIPTION

Figure 1:
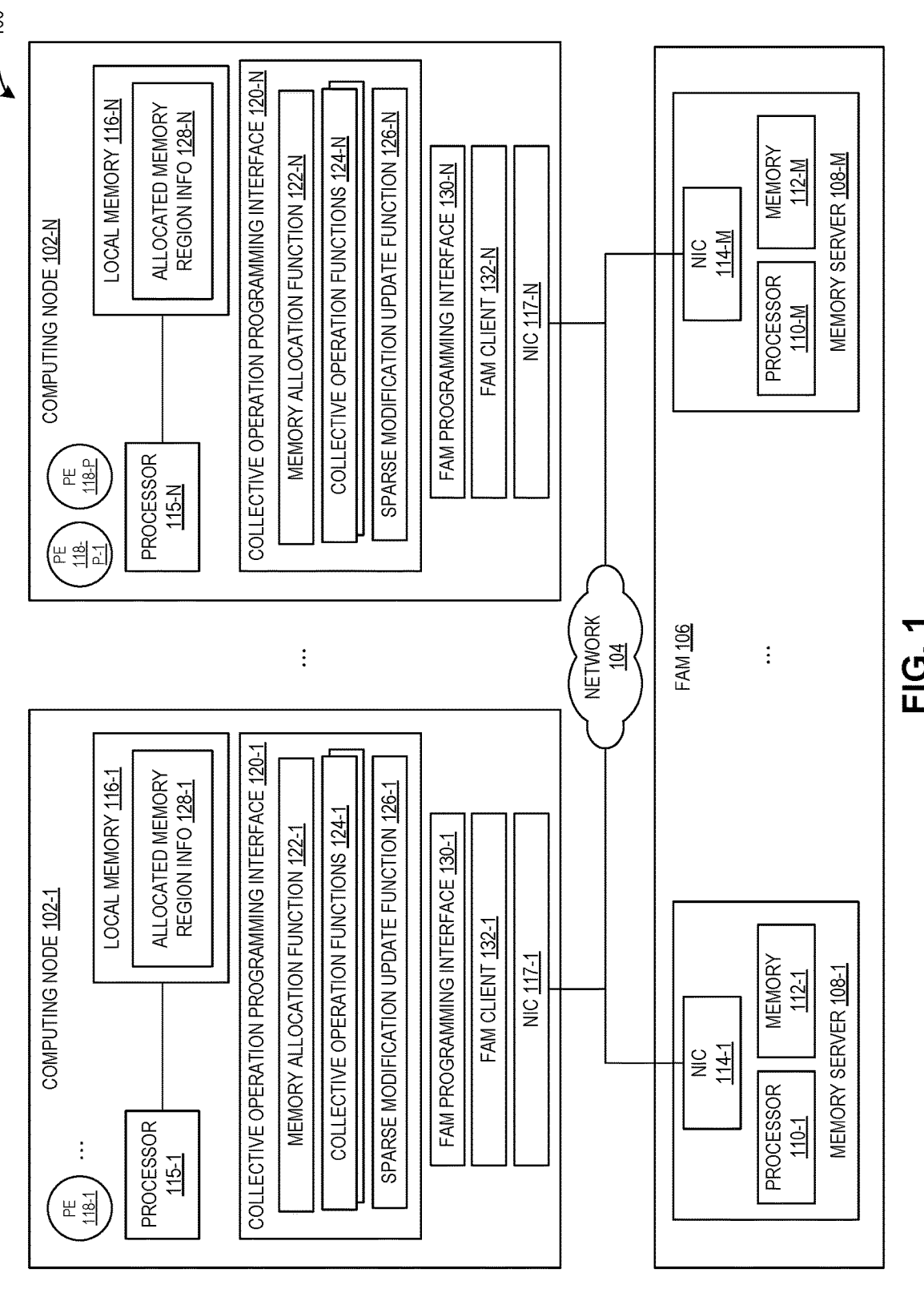
FIG. 1 illustrates an environment for facilitating efficient iterative collective operations using a network-attached memory, in accordance with an aspect of the present application.

Aspects of the instant application provide a method, computer system, and computer-readable medium which facilitate efficient iterative collective operations using a network-attached memory. A collective operation (e.g., a message passing interface (MPI) collective operation) can allocate a memory region in a network-attached memory (e.g., a fabric-attached memory (FAM) node) for data and can offload computation to the FAM node via remote procedure calls. The described aspects can transfer the entire dataset to the FAM on a first iteration of the collective operation. Using a new interface call, the described aspects can perform updates with sparse modifications by updating only specific segments of the dataset in the allocated memory region in the network-attached memory. As a result, on subsequent iterations of the collective operation, the described aspects can bypass transferring the entire dataset.

Thus, by using the new interface call to update only the sparse modifications to the entire dataset, the described aspects can result in reducing both the number of communications with the network-attached memory as well as the amount of data transferred to and from the network-attached memory. This reduction in communications and data volume can result in a more efficient system for performing iterative collective operations using a network-attached memory.

As described above, process entities or ranks on multiple computing nodes may perform a collective operation, in which each rank may distribute its portion of data across the ranks or each rank may send its portion of data to one rank which performs computation and returns the result to every other rank. A parallel computing architecture is described below in relation to FIG. 1. Performance of a collective operation may include a large quantity of messages passed between the involved process entities, as described below in relation to the collective operations of FIGS. 3A-3D. In addition, performance of a collective operation may involve computations which consume the processing resources of the computing nodes.

Furthermore, performance of a collective operation may require the entire sequence of transfer and compute operations to be performed, even when only a few data elements are modified (i.e., sparse modifications) in a sequence of repeated operations. Collective operations with sparse modifications incur the original volume of data transfer, despite only a portion of the data being modified in subsequent operations. In the case of iterative collective operations with sparse modifications, this inefficiency can be compounded, as each iteration also incurs the original volume of data transfer.

The described aspects provide a system which can allocate a memory region in a network-attached memory, which allows process entities or ranks in multiple computing nodes to access the allocated memory region. This in turn can result in the computing nodes exchanging data using the allocated memory region instead of passing messages between the computing nodes in order to perform a collective operation. Computation involved in the collective operation can also be offloaded to a processor in the network-attached memory.

In addition, after the first iteration of a collective operation is performed (including memory allocation and a full dataset transfer), a new interface call can be used to perform updates with sparse modifications. All subsequent iterations of the collective operation therefore do not need to transfer any data to the allocated memory region. Instead, the subsequent iterations of the collective operation need only read the resulting data from the memory region. Thus, by using the new interface call, the described aspects can eliminate the need for full dataset transfers on subsequent iterations of a collective operation, which can result in a significant improvement in performance.

A collective operation in a parallel computing architecture (such as depicted in FIG. 1) can be based on an interface which passes messages among process entities or ranks in computing nodes. One example of such an interface is Message Passing Interface (MPI), which defines the syntax and semantics of library routines to support parallel computations (including MPI collective operations) across computing nodes. MPI can provide a communication interface by implementing an application programming interface (API), which can include functions, routines, or methods that can be called or invoked by process entities or ranks executing on computing nodes. These functions, routines, or methods can include MPI collective operations. Other types of interfaces which facilitate communications among process entities or ranks in computing nodes may also be used.

A "computing node" can refer to a computer, a portion of a computer, or a collection of multiple computers.

A "memory server" can refer to a computing entity associated with a persistent memory. The persistent memory may reside in the memory server or may be external to the memory server. The persistent memory can be implemented with one or more persistent memory devices, such as flash memory devices, disk-based storage devices, or other types of memory devices that are able to retain data when power is removed. The memory server may also be associated with volatile memory, which can be implemented with one or more volatile memory devices, such as dynamic random access memory (DRAM) devices, static random access memory (SRAM) devices, or other types of memory devices that retain data while powered but lose the data when power is removed. In some aspects, the memory server can include one or more processors and a network interface card (NIC), as described below in relation to FIG. 1.

Environment for Facilitating Efficient Iterative Collective Operations Using a Network-Attached Memory FIG. 1 illustrates an environment 100 for facilitating efficient iterative collective operations using a network-attached memory, in accordance with an aspect of the present application. Environment 100 can include multiple computing nodes 102-1 to 102-N (where N is greater than or equal to 2). Computing nodes 102-1 to 102-N can be part of a cluster of computing nodes and can be interconnected by a network 104 to a network-attached memory (e.g., a FAM 106). FAM 106 can include multiple memory servers 108-1 to 108-M (where M is greater than or equal to 2). M can be the same as N, or M can be different from N. Network 104 can include an interconnect (e.g., a throughput, low-latency interconnect) between processors and memories, which can be based on an open-source standard, a protocol defined by a standards body, or a proprietary implementation.

Each memory server can include a respective processor, memory, and network interface card (NIC). For example, memory server 108-1 can include a processor 110-1, a memory 112-1, and a NIC 114-1. Similarly, memory server 108-M can include a processor 110-M, a memory 112-M, and a NIC 114-M. The respective processor can include a central processing unit (CPU) that executes an operating system (OS) and other machine-readable instructions (including firmware such as a Basic Input/Output System (BIOS) and an application program) of the memory server. In some aspects, the respective processor can refer to another type of processor, such as a graphics processing unit (GPU) that handles specific computations in the memory server. The respective memory can be a persistent memory, a volatile memory, or a combination of both. The respective NIC can allow the memory server to communicate over network 104 based on one or more protocol layers.

Each computing node can also include a respective processor, local memory, and NIC. For example, computing node 102-1 can include a processor 115-1, a local memory 116-1, and a NIC 117-1. Similarly, computing node 102-N can include a processor 115-N, a local memory 116-N, and a NIC 117-N. In general, a computing node can include one or more processors. The respective local memory can be implemented using one or more memory devices, which can be any combination of the persistent memory and volatile memory described herein. The respective NIC can allow the computing node to communicate over network 104 based on one or more protocol layers.

A processor of a computing node can execute one or more process entities (PEs). A PE can refer to a "rank" associated with a program under execution in the computing node. The program can be an application program or another type of program, such as an OS, firmware, and another type of machine-readable instructions. As shown in environment 100, processor 115-1 can execute a PE 118-1, and processor 115-N can execute PEs 118-P-1 to 118-P. Each PE can access data stored in FAM 106, by reading data from or writing data to FAM 106. Each PE can also perform computations on data read from FAM 106 or data to be written to FAM 106.

A total of P PEs can be executed across computing nodes 102-1 to 102-N. The P PEs can make up P ranks, which can cooperate to perform a collective operation. The P ranks can be part of a communication group that together perform the collective operation. Although certain numbers of PEs are illustrated in computing nodes 102-1 to 102-N, in some aspects, a different or a same number of PEs can execute in each computer node.

Computing node 102-1 can further include a collective operation programming interface 120-1, which can be an API, such as an MPI API or another type of API. Collective operation programming interface 120-1 can include: a memory allocation function 122-1; collective operation functions 124-1; and a sparse modification update function 126-1. Memory allocation function 122-1 can be called (invoked) by a PE (e.g., 118-1) in computing node 102-1 to allocate a memory region in FAM 106 to perform a collective operation, e.g., MPI_Alloc_mem functions. Collective operation functions 124-1 can be called by a PE (e.g., 118-1) in computing node 102-1 to initiate corresponding collective operations that can employ the allocated memory region in FAM 106, e.g., MPI collective operations as described below in relation to FIGS. 3A-3D. Sparse modification update function 126-1 can be called by a PE (e.g., 118-1) in computing node 102-1 to update only certain specified portions of a segment of data previously written to FAM 106. A detailed description of update function 126-1 is provided below in relation to FIGS. 6B and 7.

During operation, PE 118-1 can call memory allocation function 122-1, which allocates a memory region in FAM 106 for use by the ranks involved in a collective operation.

The ranks involved in the collective operation can include PEs 118-1 to 118-P. In some aspects, the ranks involved in the collective operation can include a subset of the PEs 118-1 to 118-P. Subsequent to the memory region being allocated by memory allocation function 122-1, PEs 118-1 to 118-P can write data to the allocated memory region and read data from the allocated memory region. Information pertaining to the allocated memory region can be stored as, e.g., allocated memory region information 128-1 in local memory 116-1 of computing node 102-1. Allocated memory region information 128-1 can include a data structure which stores mappings of virtual addresses to descriptors of physical locations of memory (e.g., a FAM descriptor associated with one of memory 112-1 to 112-M).

After the memory region has been allocated by a memory allocation function invoked by a given PE, any of the PEs 118-1 to 118-P can invoke a collective operation function to initiate a collective operation that makes use of the allocated memory region.

Computing node 102-1 can further include a FAM programming interface 130-1 and a FAM client 132-1. FAM programming interface 130-1 can include an API, a library, or any other program-accessible subsystem that is invoked in a computing node to perform an operation with respect to FAM 106, including a read operation, a write operation, a computation offloaded to FAM 106, or another operation involving data. In some aspects, FAM programming interface 130-1 can include an API that includes functions that are useable by computing nodes (or more specifically, by PEs in computing nodes) to manage FAM 106 and to access data of FAM 106. An example of such an API is an OpenFAM API. FAM client 132-1 can be a program executed in computing node 102-1 to manage the access of FAM 106, such as in response to calls to FAM programming interface 130-1.

Figure 2:
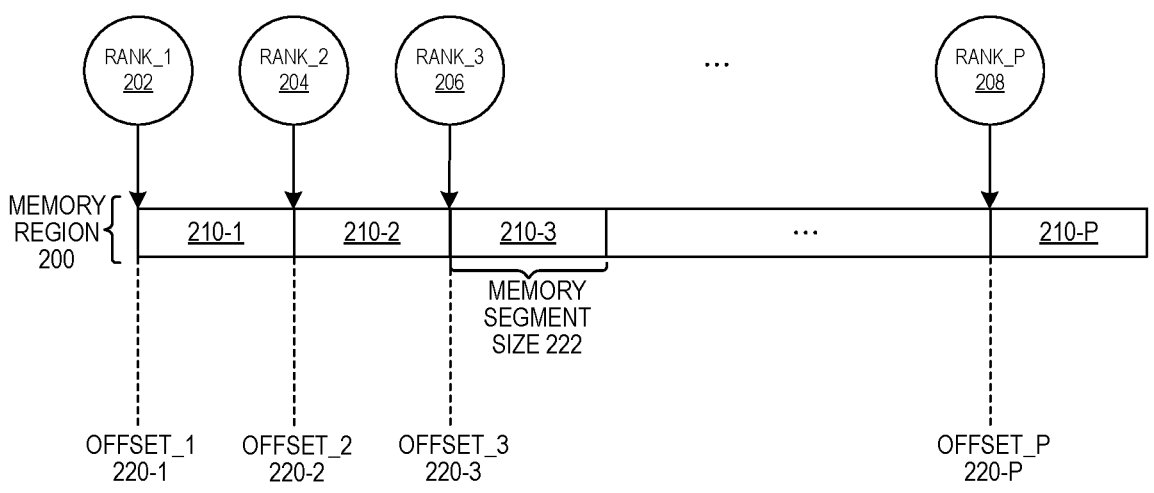
FIG. 2 illustrates a memory region with memory segments allocated to ranks, in accordance with an aspect of the present application.

Computing node 102-N can include similar elements with functionality as described above in relation to computing node 102-1, including: a collective operation programming interface 120-N, which includes a memory allocation function 122-N, collective operation functions 124-N, and a sparse modification update function 126-N; a FAM programming interface 130-N; and a FAM client 132-N.
Examples of Network-Attached Memory and Collective Operations FIG. 2 illustrates a memory region 200 with memory segments allocated to ranks, in accordance with an aspect of the present application. As described above in relation to environment 100, memory allocation function 122-1, when invoked, can allocate a memory region 200 in the persistent memory (e.g., 112-1 to 112-M) of FAM 106. Each of the PEs (ranks 1 to P) can be allocated a corresponding segment or portion of memory region 200.

The segment allocated to a given rank can include a memory portion of a specified memory portion size at a corresponding fixed "offset." An offset can refer to a memory location (e.g., represented by a memory address) of persistent memory. For the P ranks, memory region 200 can be divided into P memory segments 210-1 to 210-P allocated to the corresponding P ranks (ranks 1 to P, depicted as a rank_1 202, a rank_2 204, a rank_3 206, and a rank_P 208). Each of the memory segments 210-1 to 210-P can have the same memory segment size (e.g., a memory segment size 222) or a different memory segment size.

A memory segment 210-$j$ ($j$=1 to P) allocated to rank j can start at offset j (not shown in FIG. 2). Thus, in memory region 200 of FIG. 2: memory segment 210-1 allocated to rank_1 202 starts at an offset_1 220-1; memory segment

210-2 allocated to rank_2 204 starts at an offset_2 220-2; memory segment 210-3 allocated to rank_3 206 starts at an offset_3 220-3; and memory segment 210-P allocated to rank_P starts at an offset_P 220-P Although examples discussed herein refer to ranks starting at 1, in some aspects, ranks can start at other numbers, such as 0 (as depicted below in relation to FIGS. 3A-3D and 7) or a different starting number. In some aspects, an offset can be determined based on a product of a rank number (j) and the memory segment size. The rank number can be an identifier of a rank. For example, PEs 118-1 to 118-P can have rank numbers 1 to P.

One rank (e.g., rank 1) can call memory allocation function 122-1 to allocate memory region 200. Each of the other ranks (e.g., ranks 2 to P) can similarly call a memory lookup function of a collective operation programming interface to obtain information pertaining to allocated memory region 200, which can allow the other ranks to access their allocated memory segments of allocated memory region 200.

FIGS. 3A-3D illustrate examples of collective operations, in accordance with an aspect of the present application. The collective operations depicted in FIGS. 3A-3D (including broadcast, scatter, gather, all-gather, and all-to-all) can be performed by ranks in computer nodes 102-1 to 102-N of FIG. 1. Collective operations other than those illustrated in FIGS. 3A-3D can also be performed, e.g., reduce collective operations as described below in relation to FIGS. 5A-5B and 6A-6C.

Each of FIGS. 3A-3D depicts two arrays, including a first array indicating a state prior to the collective operation and a second array indicating a state subsequent to the collective operation. Each array can include rows representing ranks 0-5 (302) as numbered rows which are vertically ascending, and can further include columns representing "data units" (304) as elements of each rank or numbered row from left to right. A data unit can refer to a portion of data to be communicated among other ranks. A data unit can include a message, an information element, or any other portion of data.

Figure 3A:
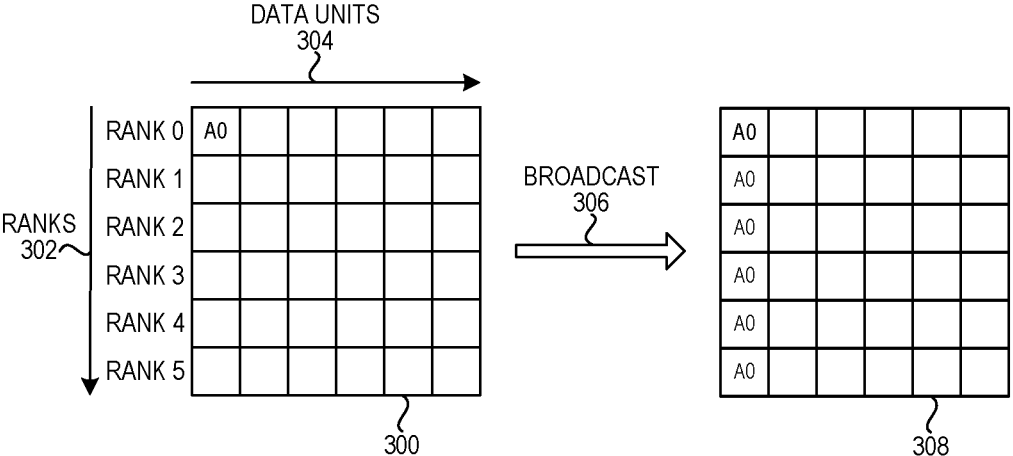
FIGS. 3A-3D illustrate examples of collective operations, in accordance with an aspect of the present application.

FIG. 3A illustrates an example broadcast collective operation. The broadcast collective operation of FIG. 3A broadcasts (306) data unit A0 from rank 0 (as depicted by an array 300) to all other ranks 1-5, which results in all of ranks 0-5 including a copy of data unit A0 (as depicted by an array 308)

Figure 3B:
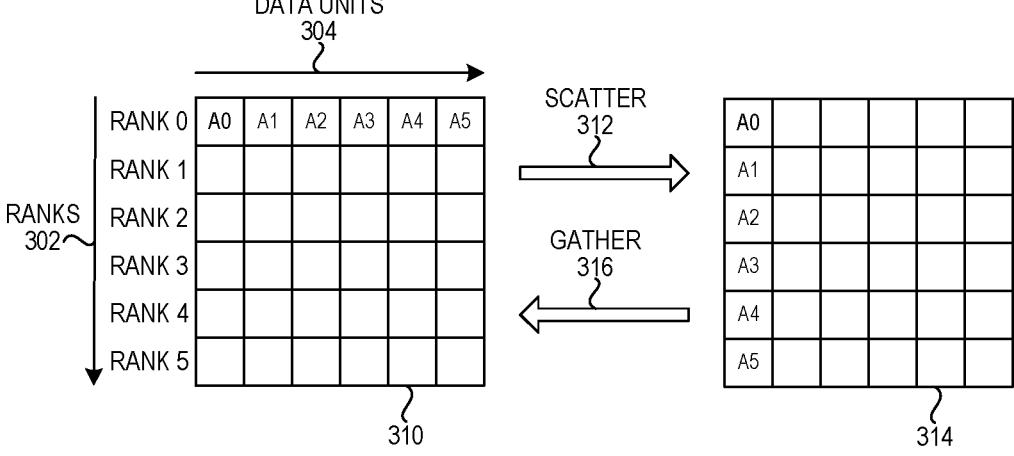

FIG. 3B illustrates an example scatter collective operation and an example gather collective operation. The scatter collective operation of FIG. 3B scatters (312) data units A0-A5 from rank 0 (as depicted by an array 310) to ranks 0-5 (as depicted by an array 314). The gather collection operation gathers (316) data units A0-A5 from ranks 0-5 (as depicted by array 314) to rank 0 (as depicted by array 310). In some aspects, a scatter-gather collective operation can be initiated, which performs both scattering and gathering of data units among ranks 0-5.

Figure 3C:
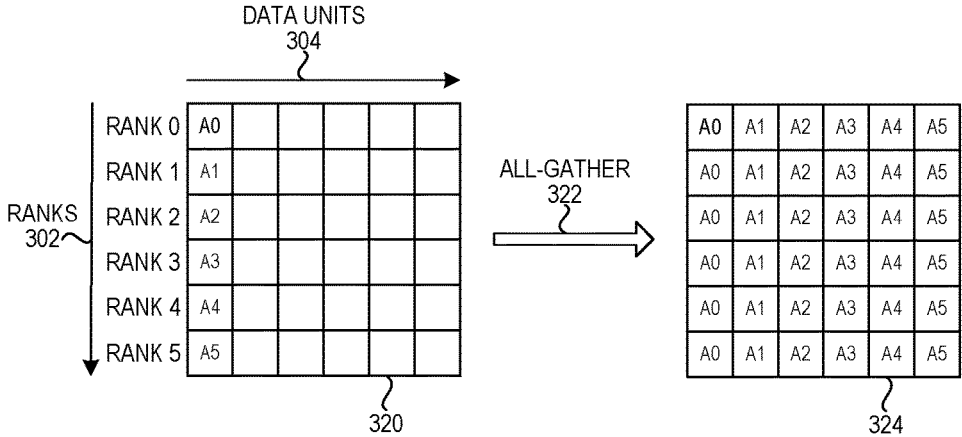

FIG. 3C illustrates an example all-gather collective operation, which gathers (322) data units A0-A5 from ranks 0-5 (as depicted by an array 320) to all other ranks 0-5 such that each rank has data units A0-A5 (as depicted by an array 324). As depicted by array 320, data unit A0 is initially stored at rank 0, data unit A1 is initially stored at rank 1, data unit A2 is initially stored at rank 2, data unit A3 is initially stored at rank 3, data unit A4 is initially stored at rank 4, and data unit A5 is initially stored at rank 5. In the all-gather collective operation, rank 0 gathers data units A0-A5 from ranks 0-5, rank 1 gathers data units A0-A5 from ranks 0-5, rank 2 gathers data units A0-A5 from ranks 0-5, rank 3 gathers data units A0-A5 from ranks 0-5, rank 4 gathers data units A0-A5 from ranks 0-5, and rank 5 gathers data units A0-A5 from ranks 0-5.

Figure 3D:
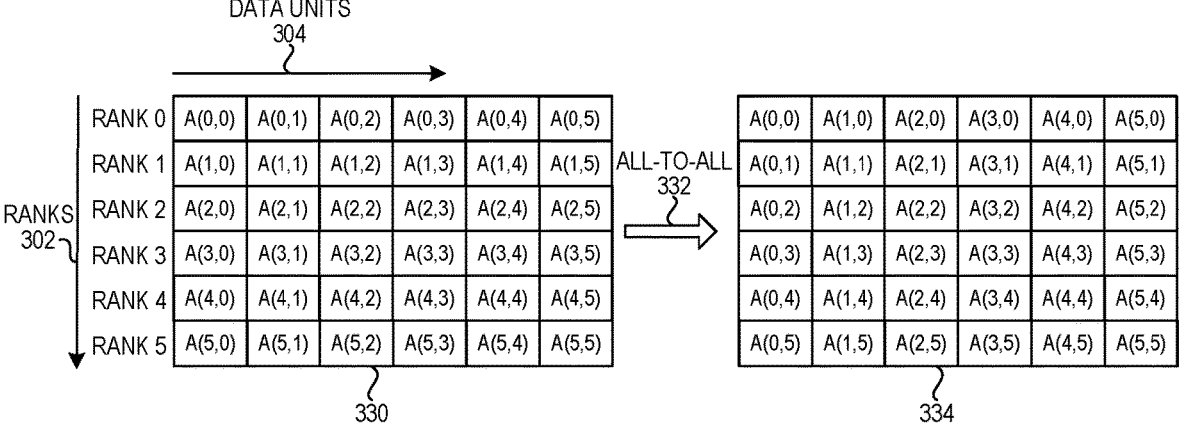

FIG. 3D illustrates an example all-to-all collective operation, which distributes (332) data units A(0,0) to A(5,5) initially stored at ranks 0-5 (as depicted by an array 330) among ranks 0-5 such that each rank has data units initially stored at the other ranks (as depicted by an array 334). As depicted by array 330, data units A(0,0) to A(0,5) are initially stored at rank 0, data units A(1,0) to A(1,5) are initially stored at rank 1, data units A(2,0) to A(2,5) are initially stored at rank 2, data units A(3,0) to A(3,5) are initially stored at rank 3, data units A(4,0) to A(4,5) are initially stored at rank 4, and data units A(5,0) to A(5,5) are initially stored at rank 5. In the all-to-all collective operation, rank 0 gathers data units A(0,0), A(1,0), A(2,0), A(3,0), A(4,0), A(5,0) from ranks 0-5, rank 1 gathers data units A(0,1), A(1,1), A(2,1), A(3,1), A(4,1), A(5,1) from ranks 0-5, rank 2 gathers data units A(0,2), A(1,2), A(2,2), A(3,2), A(4,2), A(5,2) from ranks 0-5, rank 3 gathers data units A(0,3), A(1,3), A(2,3), A(3,3), A(4,3), A(5,3) from ranks 0-5, rank 4 gathers data units A(0,4), A(1,4), A(2,4), A(3,4), A(4,4), A(5,4) from ranks 0-5, and rank 5 gathers data units A(0,5), A(1,5), A(2,5), A(3,5), A(4,5), A(5,5) from ranks 0-5.

Communications for Memory Allocation in a Collective Operation

Figures 4A, 4B:
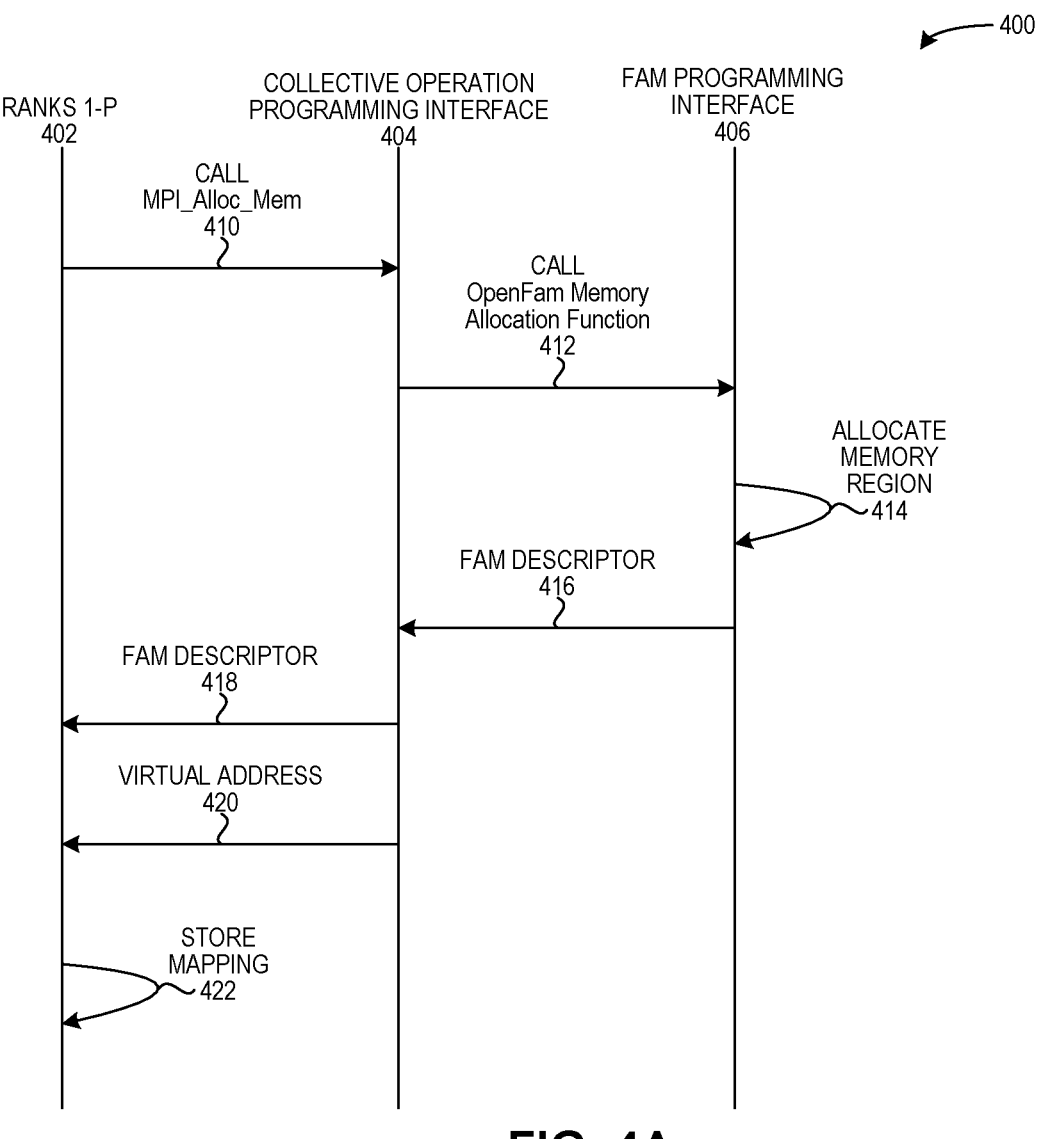
FIG. 4A presents a diagram illustrating communications for memory allocation in a collective operation, in accordance with an aspect of the present application.
FIG. 4B depicts a data structure storing a virtual mapping, in accordance with an aspect of the present application.

FIG. 4A presents a diagram 400 illustrating communications for memory allocation in a collective operation, in accordance with an aspect of the present application. Diagram 400 illustrates communications between the following entities: ranks 1-P 402, similar to PEs 118-1 to 118-P of FIG. 1; a collective operation programming interface 404, similar to collective operation programming interfaces 120-1 and 120-N of FIG. 1; and a FAM programming interface 406, similar to FAM programming interfaces 130-1 and 130-N of FIG. 1.

In order to allocate a memory region (e.g., memory segments in FAM 106) for a collective operation, each of ranks 1-P 402 can call a memory allocation function, such as an MPI_Alloc_mem function or call 410 in collective operation programming interface 404. Calling the memory allocation function can result in allocating the requested memory region (e.g., memory segments 210-1 to 210-P in memory region 200) in FAM 106. As described above in relation to FIG. 2, each memory segment can begin at a respective offset (e.g., any of offsets 220-1 to 220-P) and can be determined as a product of the rank number and the specified memory segment size (222). The MPI_Alloc_mem function can also allocate a memory segment in a local memory for each rank (e.g., local memory 116-1 to 116-N), where the memory segment allocated in the local memory can serve as a cache memory for the respective memory segment allocated in FAM 106.

In some aspects, in response to the MPI_Alloc_mem 410 function being called, collective operation programming interface 404 can call an allocation function in FAM programming interface 406, such as an OpenFam memory allocation function like fam_allocate( ) which can cause memory servers 108-1 to 108-M to allocate a memory region in FAM 106 (indicated by an allocate memory region 414 operation). The allocated memory region in FAM 106 can include P memory segments for the P ranks.

FAM programming interface 406 can return, as a result of calling, e.g., fam_allocate( ) a FAM descriptor 416 for the allocated memory region. FAM descriptor 416 can include a starting address of the allocated memory region as well as other information related to the memory region. Collective programming interface 404 can receive FAM descriptor 416, as a result of having called the MPI_Alloc_mem function.

Collective programming interface 404 can send both a FAM descriptor 418 and a virtual address 420 to the respective rank. Thus, when a rank j calls the MPI_Alloc_mem function, rank j can receive the virtual address and the FAM descriptor corresponding to allocated memory region for use by the other ranks. A respective computing node (e.g., associated with a given rank or PE) can create and store in a data structure an entry which includes a mapping of virtual address 420 to FAM descriptor 418 (indicated by a store mapping 422 operation). An example mapping table and entry are depicted below in relation to FIG. 4B.

FIG. 4B depicts a data structure 430 storing a virtual mapping, in accordance with an aspect of the present application. Data structure 430 can correspond to the communications of FIG. 4A. Data structure 430 can be stored in, e.g., allocated memory region information 128-1 to 128-N. Data structure 430 can include entries indicating at least a virtual address 432 and a FAM descriptor 434. An entry 436 can be created during memory allocation communications, e.g., operation 422 of FIG. 4A. Entry 436 can include at least a virtual address with a value of "VA_123" and a FAM descriptor with a value of "FAMD_123."

Examples of Reduce Operations

Figure 5A:
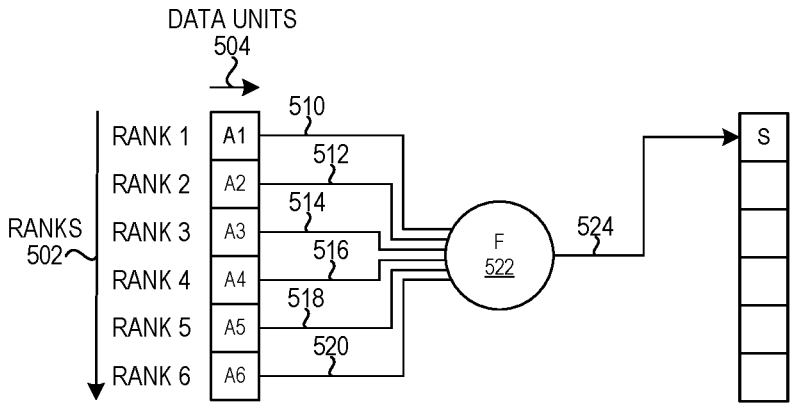
FIG. 5A illustrates a reduce collective operation, in accordance with an aspect of the present application.

FIG. 5A illustrates a reduce collective operation, in accordance with an aspect of the present application. Ranks 502 can include ranks 1-6 that store data units 504, e.g., ranks 1, 2, 3, 4, 5, and 6 can initially store data units A1, A2, A3, A4, A5, and A6, respectively. The reduce collective operation can collect data units A1, A2, A3, A4, A5, and A6 from ranks 1, 2, 3, 4, 5, and 6 (as shown, respectively, by 510, 512, 514, 516, 518, and 520) and can apply a reduction operation or function F 522 on the collected data units. Reduction function F 522 can be, e.g., a sum, maximum, minimum, median, average, or another operation that aggregates data on the collected data units. Reduction function F 522 can output a value based on collected data units A1, A2, A3, A4, A5, and A6, which can be represented as "S" and stored at rank 1 (as shown by 524).

Figure 5B:
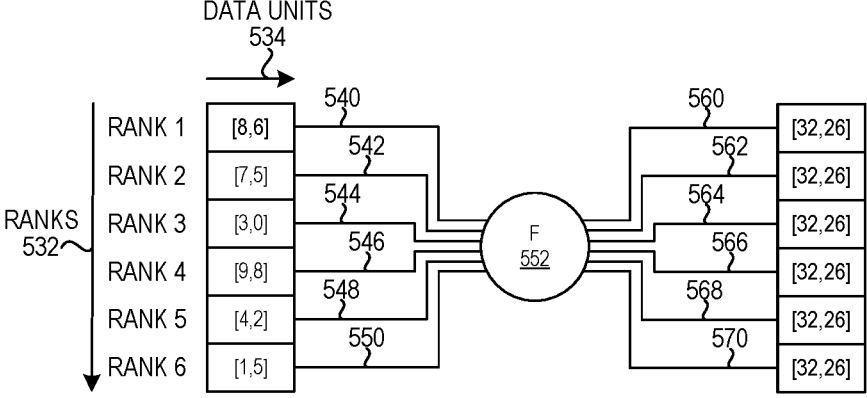
FIG. 5B illustrates an all-reduce collective operation, in accordance with an aspect of the present application.

FIG. 5B illustrates an all-reduce collective operation, in accordance with an aspect of the present application. Ranks 532 can include ranks 1-6 that store data units 534, e.g.: rank 1 can initially store a vector [8,6]; rank 2 can initially store a vector [7,5]; rank 3 can initially store a vector [3,0]; rank 4 can initially store a vector [9,8]; rank 5 can initially store a vector [4,2]; and rank 6 can initially store a vector [1,5]. The all-reduce collective operation can collect data units 534 from ranks 1, 2, 3, 4, 5, and 6 (as shown, respectively, by 540, 542, 544, 546, 548, and 550) and can apply a reduction operation or function F 552 on the collected data units. Reduction function F 552 can apply, e.g., an indexed vector sum operation, in which data values at a first index of the vectors are added together (i.e., 8+7+3+9+4+1) to produce 32, and data values at a second index are added together (i.e., 6+5+0+8+2+5) to produce 26. Reduction function F 552 can thus produce an output vector [32,26] that is distributed to each of ranks 1, 2, 3, 4, 5, and 6.

Figure 6A:
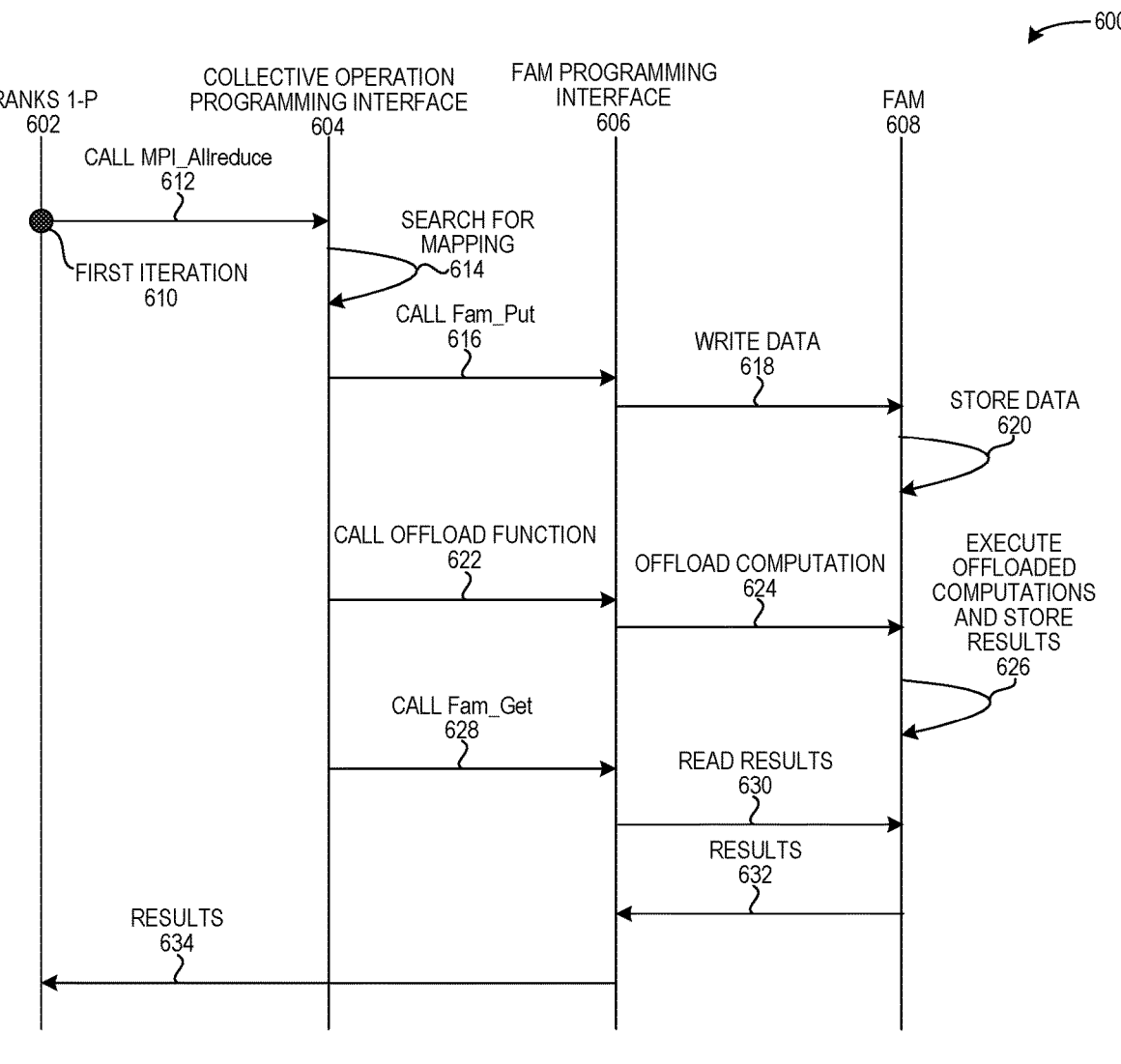
FIG. 6A presents a diagram illustrating communications for efficient iterative collective operations using a network-attached memory, including a first iteration of an all-reduce collective operation, in accordance with an aspect of the present application.

Communications for Efficient Iterative all-Reduce Collective Operations, Including Update Operation FIG. 6A presents a diagram 600 illustrating communications for efficient iterative collective operations using a network-attached memory, including a first iteration 610 of an all-reduce collective operation, in accordance with an aspect of the present application. First iteration 610 can include communications 612-634, as described herein. Diagram 600 illustrates communications between the following entities: ranks 1-P 602, similar to ranks 1-P 402 of FIG. 4A and PEs 118-1 to 118-P of FIG. 1; a collective operation programming interface 604, similar to collective operation programming interfaces 404 of FIG. 4A and 120-1 and 120-N of FIG. 1; a FAM programming interface 606, similar to FAM programming interfaces 406 of FIG. 4A and 130-1 and 130-N of FIG. 1; and a FAM 608, similar to FAM 106 of FIG. 1. The communications depicted in diagram 600 assume that the memory allocation communications of FIG. 4A have already occurred for performing the all-reduce collective operation, and that entry 446 already stores the mapping of the virtual address to the FAM descriptor for the memory region allocated to the all-reduce collective operation.

In order to perform the all-reduce collective operation, each of ranks 1-P 602 can call a collective all-reduce function, such as an MPI_Allreduce function or call 612 in collective operation programming interface 604. When using an MPI programming interface as collective operation programming interface 604, the syntax for the MPI_Allreduce function can be expressed as:

> int MPI_Allreduce (const void*sendbuf, void*recvbuf, int count,
> MPI_Datatype datatype, MPI_Op op, MPI_Comm comm),
> where:
> "*sendbuf" can indicate the starting address of a send buffer,
> "*recvbuf" can indicate the starting address of a receive buffer,
> "count" can represent a number of elements in the send buffer,
> "datatype" can represent a type of data in the send buffer,
> "op" can represent the reduction operation or function to be executed, and
> "comm" can represent the communicator or group.

In response to the MPI_Allreduce 612 function (or other collective operation) being called, collective operation programming interface 604 can search (operation 614) mapping data structure 430 using the virtual address *recvbuf to retrieve the corresponding FAM descriptor. If the entry (e.g., entry 436) containing the virtual address *recvbuf is present in mapping data structure 430, the corresponding FAM descriptor is returned as the search result. Returning a FAM descriptor as the search result can indicate that the memory region for this all-reduce collective operation has already been allocated and may be used for the all-reduce collective operation.

Collective operation programming interface 604 can call a put function in FAM programming interface 606, such as a fam_put 616 function, which can result in FAM programming interface 606 sending a command to write the data (operation 618) in the send buffer (pointed to by *sendbuf) of each rank to the allocated memory region in FAM 608. FAM 608 can store the written data (operation 620). Data contributed by different ranks can be written to respective different memory segments (at different offsets) of the allocated memory region, as described above in relation to FIG. 2.

While the multiple ranks write data from their respective send buffers to the respective memory segments of the allocated memory region of FAM 608, the system can implement a synchronization mechanism (such as a barrier operation) which forces the ranks to wait for completion of the data writes by the multiple ranks. When all the ranks have written their data to the allocated memory region of FAM 608, collective operation programming interface 604 can call an offload function 622, which can cause FAM programming interface 606 to offload the computation (operation 624) to memory servers (e.g., 108-1 to 108-M) of FAM 608. Processors (e.g., 110-1 to 110-M) of the memory servers can perform the reduction operation specified by the parameter "op." In some aspects, calling offload function 622 can cause a FAM client (e.g., 130-1 to 130-N) to queue computations of the reduction operation into queues, and, subsequent to queuing the computations, send the computations to the memory servers for execution (e.g., operation 624). FAM 608 (by the processors of the memory servers) can execute the offloaded computations and store the results, e.g., in a temporary buffer in the allocated memory region of FAM 608 (operation 626).

When the results are ready for retrieval, collective operation programming interface 604 can call a get function, such as a fam_get 628 function, which can result in FAM programming interface 606 sending a command to read the results (operation 630) in the receive buffer (pointed to by *recvbuf) of the allocated memory region in FAM 608. FAM 608 can return the requested data as results 632, which can be returned by FAM programming interface 606 and collective programming interface 604 to each of ranks 1-P 602 as results 634.

Other types of collective operations that involve computations can be performed in a similar manner, e.g., by offloading the computations to the memory servers of FAM 608.

Figure 6B:
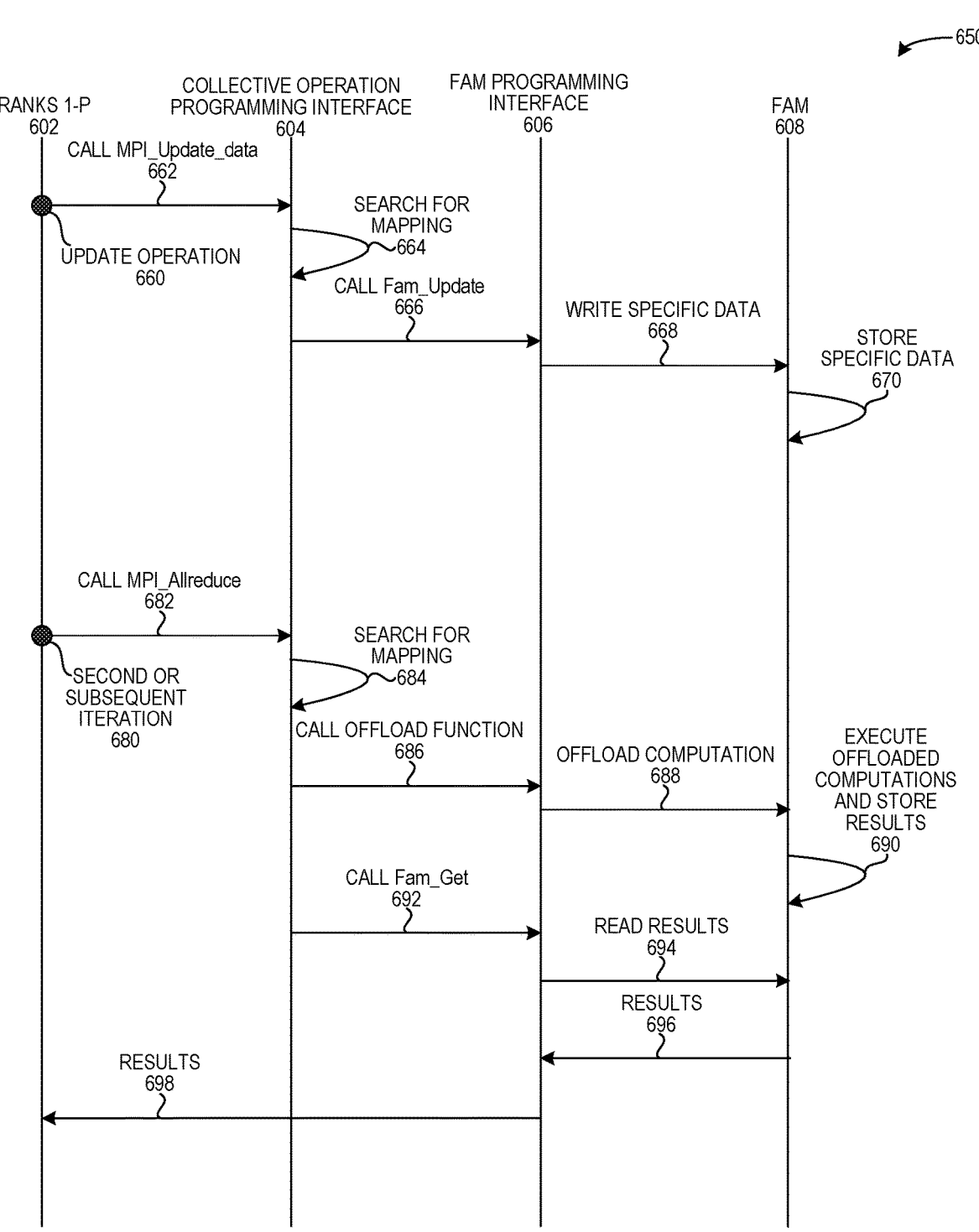
FIG. 6B presents a diagram illustrating communications for efficient iterative collective operations using a network-attached memory, including an update operation and a second or subsequent iteration of the all-reduce collective operation, in accordance with an aspect of the present application.

FIG. 6B presents a diagram 650 illustrating communications for efficient iterative collective operations using a network-attached memory, including an update operation 660 and a second or subsequent iteration 680 of the all-reduce collective operation, in accordance with an aspect of the present application. Update operation 660 can include communications 662-670 and second or subsequent iteration 680 can include communications 682-698, as described herein. Diagram 650 illustrates communications between the same entities described above in diagram 600. The communications depicted in diagram 650 assume that the communications of first iteration 610 of diagram 600 in FIG. 6A have already occurred for performing the all-reduce collective operation, and that entry 446 already stores the mapping of the virtual address to the FAM descriptor for the memory region allocated to the all-reduce collective operation.

If one or more ranks has a sparse modification of data previously transferred to and stored in the allocated memory region of FAM 608, that rank may use a new MPI interface call (e.g., an MPI_Update_data function or call 662) in collective operation programming interface 604, to update only specific parts of their respective segment in the allocated memory region. The syntax for this new MPI_Update_data call can be expressed as:

> int MPI_Update_data (const void *sendbuf, uint64_t nelems,
> uint64_t *index_array, void *new_value_array),
> where:
> "*sendbuf" can indicate the starting address of the send buffer, i.e., the virtual address used in the MPI collective operation,
> "nelems" can indicate the number of elements in the "index_array" which are to be updated,
> "index_array" can indicate a list or array of indices corresponding to the data units to be modified, and "new_value_array" can indicate an array of the new values of the data units to be written to or updated at the corresponding indices.

An example of an update operation by a first rank updating two elements at indices 0 and 2 and by a second rank updating three elements at indices 1, 3, and 5 is described below in relation to FIG. 7.

In response to the MPI_Update_data 662 function being called, collective operation programming interface 604 can search (operation 664) mapping data structure 430 using the virtual address *sendbuf to retrieve the corresponding FAM descriptor. If the entry (e.g., entry 436) is present in mapping data structure 430, the corresponding FAM descriptor is returned as the search result. Returning a FAM descriptor as the search result can indicate that the memory region for the update operation has already been allocated.

Collective operation programming interface 604 can call an update function in FAM programming interface 606, such as a fam_update 666 function, which can result in FAM programming interface 606 sending a command to write the specific data (operation 668) (as indicated in "new_value_array") to the indices (as indicated in "index_array") of the corresponding memory segment for the rank in the allocated memory region in FAM 608. FAM 608 can update and store the specific data (operation 670). Data contributed by different ranks can be written to respective different memory segments (at different offsets) of the allocated memory region, as described above in relation to FIG. 2.

After performing update operation 660, subsequent MPI collective operation calls from an application to perform the MPI collective operation do not need to transfer or write the entire dataset. As an example, as shown in FIG. 6B, second or subsequent iteration 680 of the all-reduce collective operation (i.e., of the first iteration 610 of FIG. 6A) can simply offload the computation and read the results, thus eliminating the expensive data transfer of the entire dataset by all the ranks.

That is, each of ranks 1-P 602 can call the collective all-reduce function, such as an MPI_Allreduce 682 call in collective operation programming interface 604. In response to the MPI_Allreduce 682 function being called, collective operation programming interface 604 can search (operation 684) mapping data structure 430 using the virtual address to retrieve the corresponding FAM descriptor. If the entry (e.g., entry 436) containing the virtual address is present in mapping data structure 430, the corresponding FAM descriptor is returned as the search result, which can indicate that the memory region for this all-reduce collective operation has already been allocated and may be used for the all-reduce collective operation. Because of the new update interface call described above in update operation 660, the data previously stored in the allocated memory region of FAM 608 (as a result of first iteration 610) has been updated with the sparse modification operations, and thus any subsequent calls (i.e., second or subsequent iteration 680) to the all-reduce collective operation can eliminate the operations or steps involving the writing of data (e.g., operations 616, 618, and 620 of FIG. 6A). Instead, collective operation programming interface 604 can immediately call an offload function 686, which can cause FAM programming interface 606 to offload the computation (operation 688) to processors of memory servers of FAM 608 (e.g., processors 110-1 to 110-N of memory servers 108-1 to 108-M of FAM 106). FAM 608 (by the processors of the memory servers) can execute the offloaded computations and store the results, e.g., in a temporary buffer in the allocated memory region of FAM 608 (operation 690).

When the results are ready for retrieval, collective operation programming interface 604 can call a get function, such as a fam_get 692 function, which can result in FAM programming interface 606 sending a command to read the results (operation 694) in the receive buffer (pointed to by *recvbuf) of the allocated memory region in FAM 608. FAM 608 can return the requested data as results 696, which can be returned by FAM programming interface 606 and collective programming interface 604 to each of ranks 1-P 602 as results 698.

Figure 7:
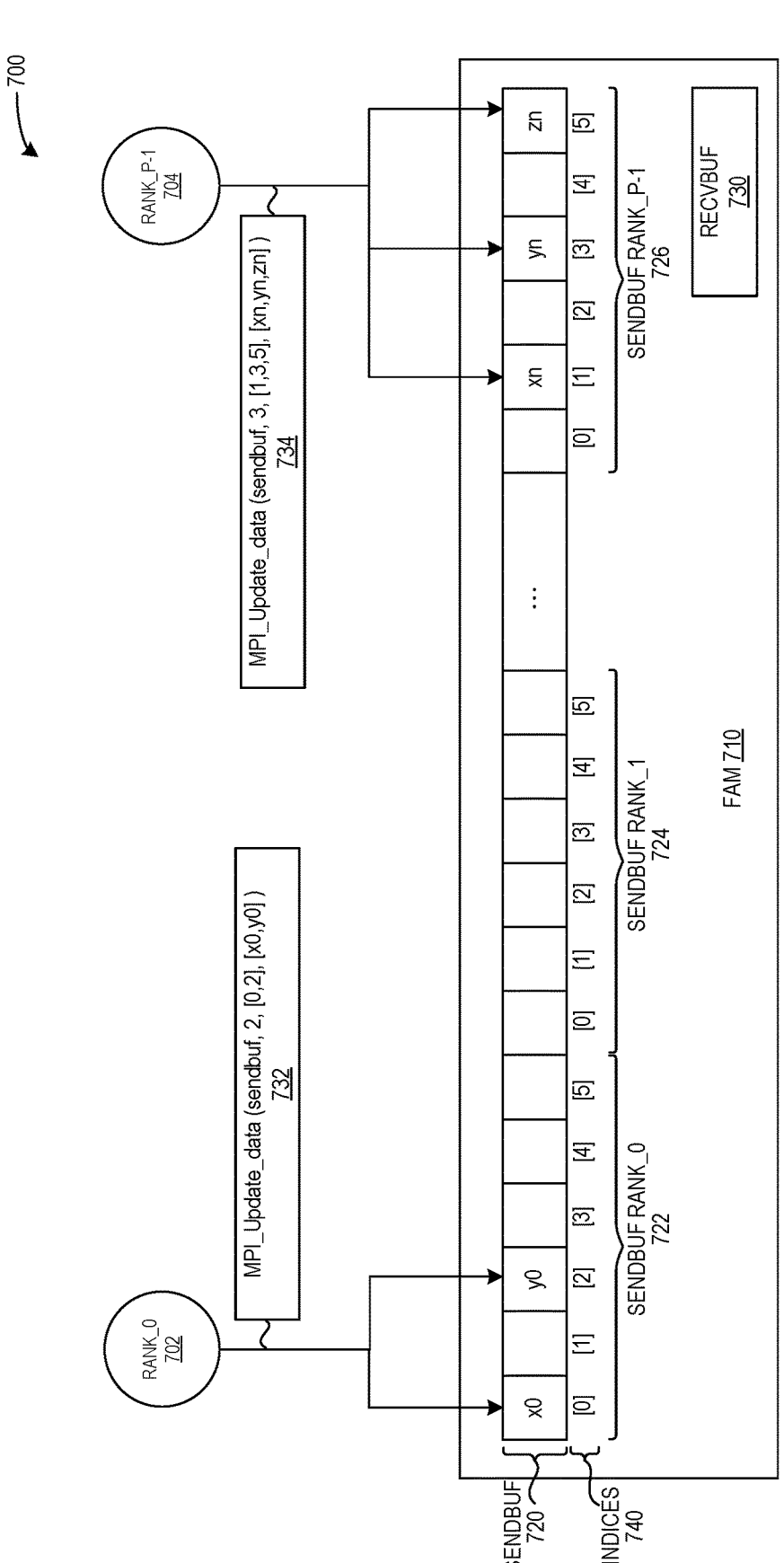
FIG. 7 illustrates a diagram of an update of segments of a network-attached memory based on an update operation, in accordance with an aspect of the present application.

FIG. 7 illustrates a diagram 700 of an update of segments of a network-attached memory based on an update operation, in accordance with an aspect of the present application. In diagram 700, the network-attached memory is illustrated as a FAM 710. FAM 710 can include an allocated memory region, which is illustrated as a send buffer ("sendbuf") 720. FAM 710 can also include a receive buffer ("recvbuf") 730, to which data or the results of a computation performed by a processor of a memory server of FAM 710 may be stored and from which such data and results may be retrieved (as described above in relation to FAM 608 of FIGS. 6A-6B).

Sendbuf 720 can include P memory segments, each of which can include six "portions" of memory (i.e., each memory segment can store six data units). Each portion of a memory segment can be indicated with an index (as indicated by indices 740), and each memory segment can correspond to one of the P ranks involved in a collective operation using the allocated memory region sendbuf 720 of FAM 710. For example, a rank_0 720 may have been allocated a sendbuf rank_0 722 memory segment with six portions of memory (e.g., storing data units corresponding to indices [0]-[5]); a sendbuf rank_1 (not shown) may have been allocated a sendbuf rank_1 724 memory segment with six portions of memory (e.g., storing data units corresponding to indices [0]-[5]); and a rank_n 704 may have been allocated a sendbuf rank_n 726 memory segment with six portions of memory (e.g., storing data units corresponding to indices [0]-[5]).

After a first iteration of the all-reduce collective operation has been called, one or more of ranks 0-$n$ can perform a sparse modification of the data already transferred and stored in the allocated memory region of FAM 710. For example, rank_0 702 can call MPI_Update_data (sendbuf, 2, [0,2], [x0,y0]) (call 732), which can result in the communications as described above in relation to update operation 660. Specifically, the parameters of call 732 can indicate: two elements or data units to be written to the corresponding memory segment (sendbuf rank_0 722) identified by a lookup of the "sendbuf" virtual address in the mapping data structure; an array or list of indices "0" and "2" corresponding to the respective portions of the corresponding memory segment (722) to be written to; and an array or list of the new values to be written at the memory locations indicated by the array of indices, with the values of, respectively, "x0" and "y0." Thus, as a result of call 732, data values "x0" and "y0" can be written to sendbuf rank_0 memory segment 722 at indices [0] and [2].

In another example, rank_n 704 can call MPI_Update_data (sendbuf, 3, [1,3,5], [xn,yn,zn]) (call 734), which can result in the communications as described above in relation to update operation 660. Specifically, the parameters of call 734 can indicate: three elements or data units to be written to the corresponding memory segment (sendbuf rank_n 726) identified by a lookup of the "sendbuf" virtual address in the mapping data structure; an array or list of indices "1," "3," and "5" corresponding to the respective portions of the corresponding memory segment (726) to be written to; and an array or list of the new values to be written at the memory locations indicated by the array of indices, with the values of, respectively, "xn," "yn," and "zn." Thus, as a result of call 734, data values "xn," "yn," and "zn" can be written to sendbuf rank_n memory segment 726 at indices [1], [3], and [5].

Figure 8A:
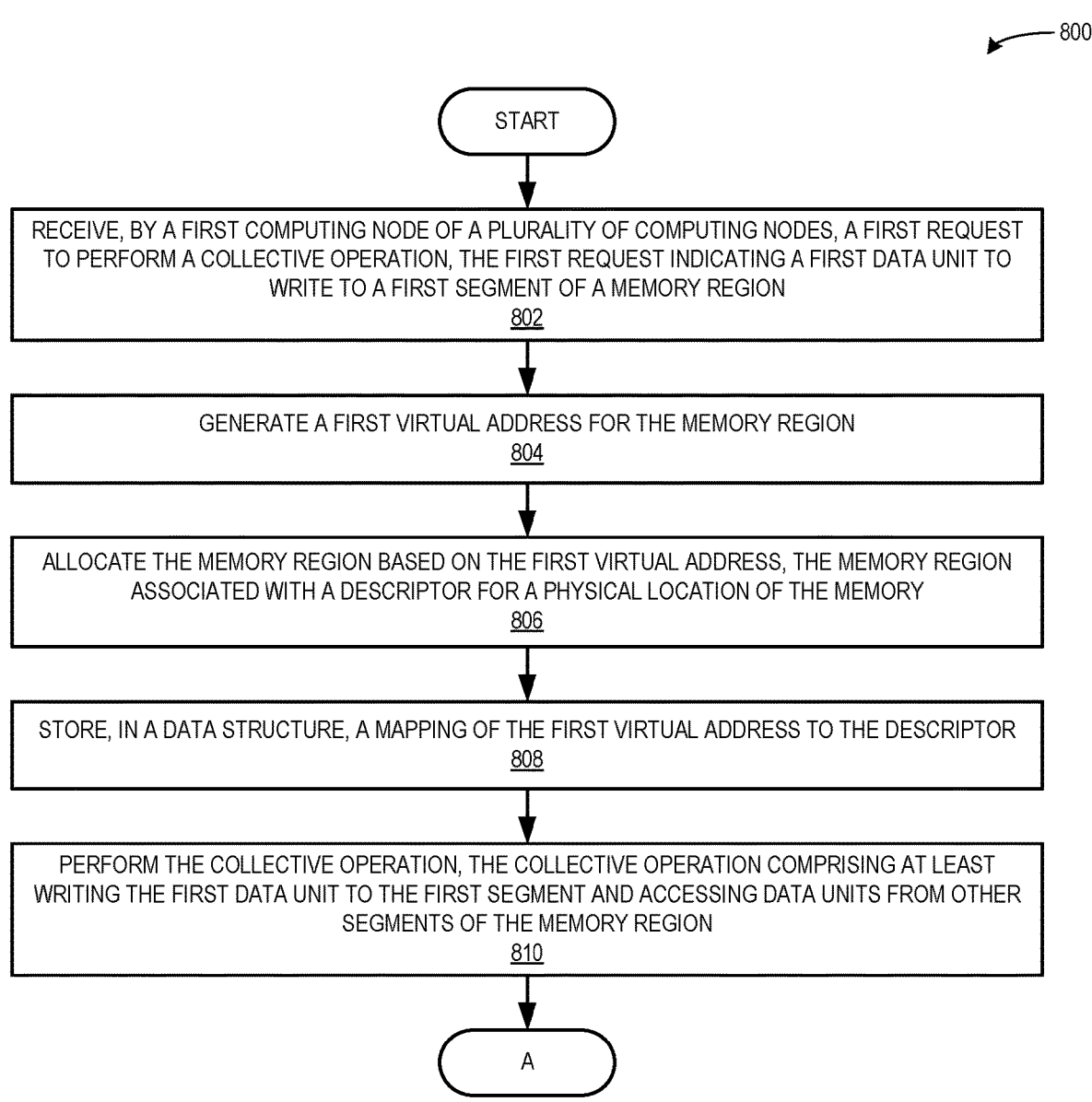

Method for Facilitating Efficient Iterative Collective Operations Using a Network-Attached Memory FIGS. 8A-8B present flowcharts 800 and 820 illustrating a method for facilitating efficient iterative collective operations using a network-attached memory, in accordance with an aspect of the present application. Flowchart 800 of FIG. 8A presents operations involved in performing a first iteration of a collective operation. The system receives, by a first computing node of a plurality of computing nodes, a first request to perform a collective operation, the first request indicating a first data unit to write to a first segment of a memory region (operation 802). The first request may correspond to a first iteration of a collective operation, similar to first iteration 610 of MPI_Allreduce 612 described above in relation to FIG. 6A. The memory region to which the first data unit is to be written can correspond to FAM 106 of FIG. 1 or FAM 608 of FIG. 6A, and the first segment may be similar to any of segments 210-1 to 210-P of memory region 200 of FIG. 2. The system generates a first virtual address for the memory region (operation 804). The first virtual address can correspond to a virtual address of a receive buffer or a send buffer indicated in the first request. The system allocates the memory region based on the first virtual address, the memory region associated with a descriptor for a physical location of the memory (operation 806). When using the OpenFAM library interface calls, the descriptor can be a FAM descriptor (416, 418) and may be returned by the FAM programming interface (406) after allocating the memory region (414), as described above in relation to FIG. 4A. The system stores, in a data structure, a mapping of the first virtual address to the descriptor (operation 808). For example, a computing node associated with one of ranks 1-P 402 may store the mapping in a mapping data structure, as described above in relation to 422 of FIG. 4A and entry 436 of mapping table 430 of FIG. 4B.

The system performs the collective operation, the collective operation comprising at least writing the first data unit to the first segment and accessing data units from other segments of the memory region (operation 810). The collective operation can include writing all the data, including writing first data unit to the first segment, to the network-attached memory (616, 618, and 620 of FIG. 6A) and can also include offloading any computations associated with the collective operation to a processor associated with the network-attached memory (622, 624, and 626 of FIG. 6A). The collective operation can also include reading all the data, including accessing data units from other segments of the memory region, from the network-attached memory (628, 630, 632, and 634 of FIG. 6A). The operation continues at Label A of FIG. 8B.

Flowchart 820 of FIG. 8B presents operations involved in performing an update operation of partial data (i.e., a sparse modification) stored in a memory segment and a second iteration of the collective operation. The system receives a second request to perform an update operation, the second request indicating a second virtual address, one or more portions of a memory region segment to be updated, and corresponding data units to write to the one or more portions (operation 822). The update operation can be a new MPI interface call, such as MPI_Update_data, as described above in relation to update operation 660 of FIG. 6B, and can include parameters such as: the virtual address of the allocated memory region segment to be updated (e.g., sendbuf); the number of portions of the segment to be updated; an array of indices corresponding to the one or more portions of the segment to be updated; and an array of new values corresponding to the data units to be written at the respective indices of the one or more portions of the segment to be updated.

The system performs a first search in the data structure for a mapping of the second virtual address (operation 824), similar to search for mapping 664 function described above in relation to FIG. 6B. The system identifies, based on the first search, the mapping of the first virtual address to the descriptor in response to the second virtual address matching the first virtual address (operation 826). A successful lookup in the data structure can indicate that the data to be updated has already been transferred and thus that the corresponding memory region has been allocated and stores the previously transferred data. The system updates, based on the identified mapping, the one or more portions of the memory region segment by writing the corresponding data units to the one or more portions (operation 828), as depicted above in relation to the results of the MPI_Update_data calls 732 and 734 of FIG. 7.

Subsequent to performing the first iteration of the collective operation (operations 802-810) and the update operation (822-828), the system receives a third request to perform the collective operation, the third request indicating a third virtual address (operation 830). The third request may correspond to a second or subsequent iteration of the collective operation, similar to second or subsequent iteration 680 of MPI_Allreduce 682 described above in relation to FIG. 6B. The system performs a second search in the data structure for the mapping of the third virtual address (operation 832), similar to search for mapping 684 function described above in relation to FIG. 6B. If the mapping is not found (decision 834), the operation returns to operation 804 of FIG. 8A, i.e., performing a memory allocation process because the unsuccessful lookup indicates that the third request does not correspond to a second or subsequent iteration, and instead, corresponds to a first iteration of the collective operation.

If the mapping is found (decision 834), the system identifies, based on the second search, the mapping of the first virtual address to the descriptor in response to the third virtual address matching the first virtual address (operation 836). A successful lookup in the data structure can indicate that the data associated with the collective operation has already been transferred and thus is already stored in the corresponding allocated memory region. The system performs the collective operation, the collective operation further comprising at least bypassing, based on the identified mapping, writing any data to the memory region and only accessing data units from the memory region (operation 838). Thus, by using the new MPI interface call MPI_Update_data for sparse modifications to the already-transferred data after the first iteration of the collective operation, a second or subsequent iteration of the collective operation can eliminate the significant traffic cost incurred from transferring the entire data set. Instead, a given rank or process entity of a computing node need only access the data units from the allocated memory region, e.g., by reading data from the receive buffer, as described above in relation to communications 692-698 of FIG. 6B and recvbuf 730 of FIG. 7. The operation returns.

Figure 9:
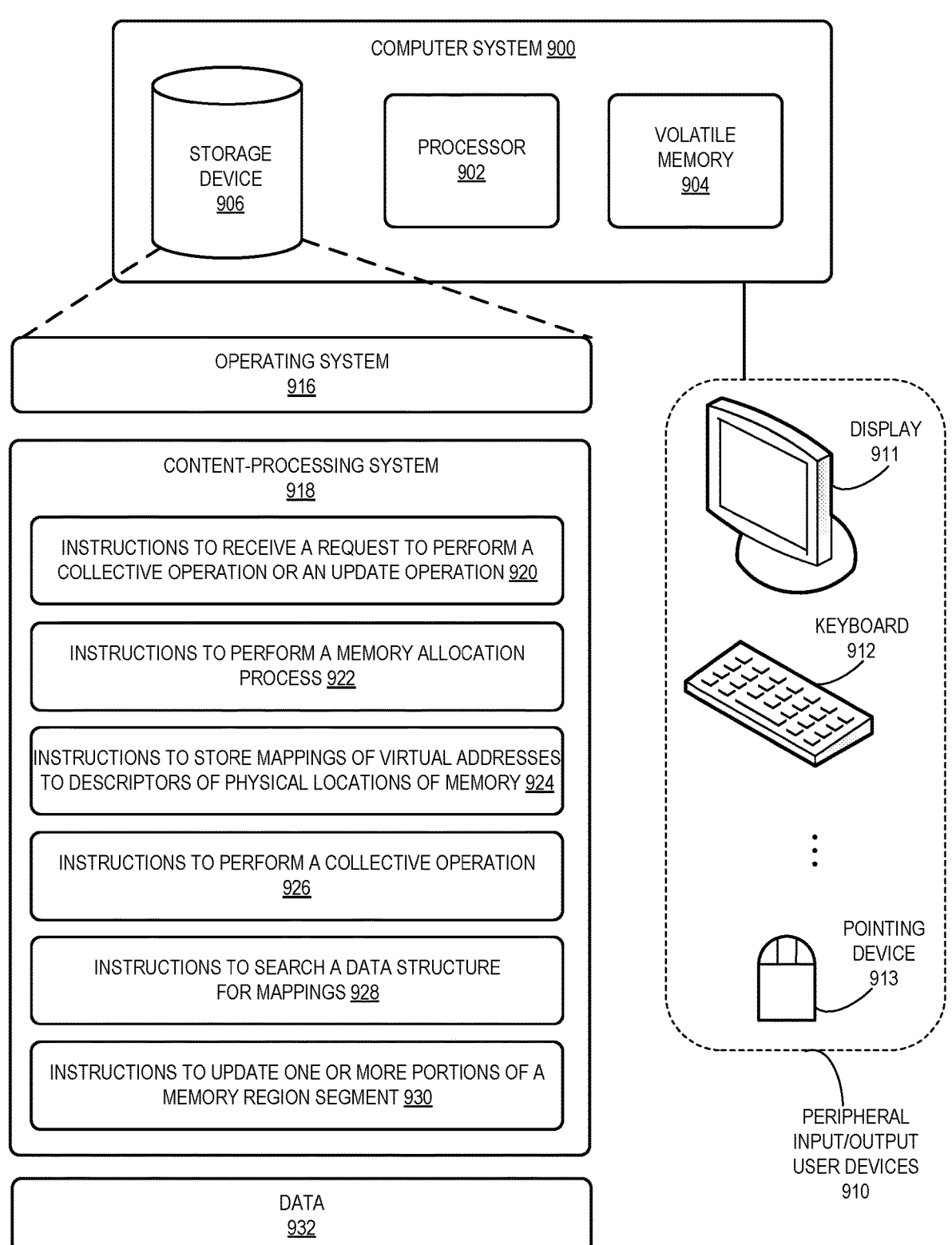
FIG. 9 illustrates a computer system for facilitating efficient iterative collective operations using a network-attached memory, in accordance with an aspect of the present application.

Computer System for Facilitating Efficient Iterative Collective Operations Using a Network-Attached Memory FIG. 9 illustrates a computer system 900 for facilitating efficient iterative collective operations using a network-attached memory, in accordance with an aspect of the present application. Computer system 900 includes a processor 902, a memory 904, and a storage device 906. Memory 904 can include a volatile memory (e.g., random access memory (RAM)) that serves as a managed memory and can be used to store one or more memory pools. Furthermore, computer system 900 can be coupled to peripheral I/O user devices 910 (e.g., a display device 911, a keyboard 912, and a pointing device 913). Storage device 906 includes non-transitory computer-readable storage medium and stores an operating system 916, a content-processing system 918, and data 932. Computer system 900 may include fewer or more entities or instructions than those shown in FIG. 9.

Content-processing system 918 can include instructions, which when executed by computer system 900, can cause computer system 900 to perform methods and/or processes described in this disclosure. Specifically, content-processing system 918 may include instructions 920 to receive a request to perform a collective operation or an update operation, as described above in relation to FIGS. 6A-6B. Content-processing system 918 can include instructions 922 to perform a memory allocation process, e.g., by allocating the memory region based on the first virtual address and determining a descriptor for a physical location of the memory, as described above in relation to FIGS. 4A-4B. Content-processing system 918 can include instructions 924 to store mappings of virtual addresses to descriptors of physical locations of memory, as described above in relation to FIGS. 1, 4A-4B, and 6A-6B.

Content-processing system 918 can also include instructions 926 to perform a collective operation, which can include at least writing a first data unit to the first segment and accessing data units from other segments of the memory region, as described above in the example collective operations of FIGS. 3A-3D and the communications of first operation 610 of FIG. 6A.

Content-processing system 918 can additionally include instructions 920 to receive a second request to perform an update operation, the second request indicating a second virtual address, one or more portions of a memory region segment to be updated, and corresponding data units to write to the one or more portions, as described above in relation to update operation 660 of FIG. 6B. Content-processing system 918 can include instructions 928 to search a data structure for mappings, including searching the data structure based on the second virtual address to obtain the mapping of the first virtual address to the descriptor, the second virtual address mapping the first virtual address, as described above in relation to functions 614, 664, and 684 of FIGS. 6A and 6B.

Content-processing system 918 can include instructions 930 to update, based on the obtained mapping, the one or more portions of the memory region segment by writing the corresponding data units to the one or more portions, as described above in relation to operation 660 of FIG. 6B and the results of the MPI interface calls 732 and 734 of FIG. 7.

Data 932 can include any data that is required as input or that is generated as output by the methods, operations, communications, and/or processes described in this disclosure. Specifically, data 932 can store at least: a request; a data unit; an indicator of a segment of a memory region; a virtual address; a virtual address corresponding to a send buffer or a receive buffer; a descriptor; a FAM descriptor; a function; a call; an interface call; an MPI collective call; an OpenFAM call; an indicator of one or more portions of memory region segment; a data structure; a mapping table; a mapping; a mapping of a virtual address to a descriptor; a result of a search or a lookup in a data structure or mapping table; a number of one or more portions of a segment; an index; a list or array of indices; and a list or array of new values or data units.

Computer system 900 and content-processing system 918 may include more instructions than those shown in FIG. 9. For example, content-processing system 918 can also store instructions for executing the operations described above in relation to: the communications in FIGS. 1, 4A-4B, 6A-6B, and 7; the operations depicted in the flowcharts of FIGS. 8A-8B; and the instructions of non-transitory computer-readable storage medium 1000 in FIG. 1000.

Non-Transitory Computer-Readable Medium for Facilitating Efficient Iterative Collective Operations Using a Network-Attached Memory FIG. 10 illustrates a non-transitory computer-readable medium 1000 for facilitating efficient iterative collective operations using a network-attached memory, in accordance with an aspect of the present application. Storage medium 1000 can store instructions that when executed by a computer cause the computer to perform the methods, operations, and functions described herein. Specifically, storage medium 1000 can store instructions 1002 to receive, by a first computing node, a first request to perform a collective operation, the first request indicating a first virtual address. Storage medium 1000 can store instructions 1004 to store, in a data structure, a mapping of the first virtual address to a descriptor for a physical location of a memory region allocated for performance of the collective operation. Storage medium 1000 can store instructions 1006 to perform a collective operation, which includes writing data units to the memory region and accessing data units from the memory region.

Furthermore, storage medium 1000 can store instructions 1002 to receive a second request to perform an update operation, the second request indicating a second virtual address, one or more portions of a memory region segment to be updated, one or more indices corresponding to the one or more portions, and one or more new values to write to the one or more portions. Storage medium 1000 can store instructions 1008 to search a data structure based on the second virtual address to obtain the mapping of the first virtual address to the descriptor, the second virtual address matching the first virtual address. Storage medium 1000 can store instructions 1010 to update, based on the obtained mapping, the one or more portions of the memory region segment by writing the one or more new values to the one or more portions at the indicated one or more indices.

Storage medium 1000 can store instructions 1002 to receive a third request to perform the collective operation, the third request indicating a third virtual address. Storage medium 1000 can store instructions 1008 to search the data structure based on the third virtual address to obtain the mapping of the first virtual address to the descriptor. Storage medium 1000 can store instructions 1012 to determine, based on the obtained mapping, that the third request is a subsequent iteration of the collective operation and that data units associated with the collective operation have been stored and updated in the memory region. Storage medium 1000 can store instructions 1014 to perform, based on the obtained mapping, the collective operation, by bypassing writing any data to the memory region and only reading data units from the memory region.

Storage medium 1000 may include more instructions than those shown in FIG. 10. For example, storage medium 1000 can also store instructions for executing the operations described above in relation to: the communications in FIGS. 1, 4A-4B, 6A-6B, and 7; the operations depicted in the flowcharts of FIGS. 8A-8B; and the instructions of content-processing system 918 in FIG. 9.

Aspects and Variations

In general, the disclosed aspects provide a method, computer system, and non-transitory computer-readable storage medium for facilitating efficient iterative collective operations using a network-attached memory. In one aspect, the system receives, by a first computing node of a plurality of computing nodes, a first request to perform a collective operation, the first request indicating a first data unit to write to a first segment of a memory region. The system generates a first virtual address for the memory region. The system allocates the memory region based on the first virtual address; the memory region associated with a descriptor for a physical location of the memory. The system stores, in a data structure, a mapping of the first virtual address to the descriptor. The system performs the collective operation, the collective operation comprising at least writing the first data unit to the first segment and accessing data units from other segments of the memory region. The system receives a second request to perform an update operation, the second request indicating a second virtual address, one or more portions of a memory region segment to be updated, and corresponding data units to write to the one or more portions. The system performs a first search in the data structure for a mapping of the second virtual address. The system identifies, based on the first search, the mapping of the first virtual address to the descriptor in response to the second virtual address matching the first virtual address. The system updates, based on the identified mapping, the one or more portions of the memory region segment by writing the corresponding data units to the one or more portions.

In a variation on this aspect, the system receives a third request to perform the collective operation, the third request indicating a third virtual address. The system performs a second search in the data structure for the mapping of the third virtual address. The system identifies, based on the second search, the mapping of the first virtual address to the descriptor in response to the third virtual address matching the first virtual address. The system performs the collective operation, the collective operation further comprising at least bypassing, based on the identified mapping, writing any data to the memory region and only accessing data units from the memory region.

In a further variation on this aspect, the memory region comprises a network-attached memory. A network-attached memory is described above in relation to memory servers 108-1 to 108-M of FIG. 1, and the memory region can correspond to memory 112-1 to 112-M of FIG. 1. FAM 106 of FIG. 1 and FAM 608 of FIG. 6 can In a further variation, the collective operation is performed by a processor associated with the network-attached memory. For example, as described above in relation to FIG. 1, processor 110-1 of memory server 108-1 and processor 110-M of memory server 108-M can perform the collective operation.

In a further variation, the collective operation comprises a Message Passing Interface (MPI) collective operation, as described above in relation to FIGS. 3A-3D.

In a further variation, the second request further indicates: a number of the one or more portions of the memory region segment to be updated; a list of indices corresponding to the one or more portions of the memory region segment to be updated, wherein a respective index corresponds to an ordered portion of the memory region segment; and the corresponding data units to write to the one or more portions, wherein a respective corresponding data unit includes a new value to be updated at the corresponding respective index. The second request can correspond to update operation 660 of FIG. 6B, including the call to MPI_Update_data 662. In addition, an example of the second request is described above in relation to the calls to MPI_Update_data 732 and 734 of FIG. 7.

In a further variation, each index in the list of indices corresponds to a respective data unit to write to a respective portion of the memory region segment, as described above in relation to the calls to MPI_Update_data 732 and 734 of FIG. 7.

In a further variation, the system receives, by a second computing node of the plurality of computing nodes, a fourth request to perform the collective operation, the fourth request indicating a second data unit to write to a second segment of the memory region. The system performs the collective operation, the collective operation further comprising at least writing the second data unit to the second segment and accessing at least the first data unit from the first segment of the memory region. For example, as described above in relation to FIG. 6A, each of ranks 1-P 602 can call the collective operation (e.g., MPI_Allreduce 612 function) as part of first iteration 610, which can include both writing data to FAM 608 (e.g., communications 616-620) and reading data from FAM 608 (e.g., communications 628-634).

In another aspect, a computer system comprises a processor and a storage device storing instructions that when executed by the processor cause the processor to perform a method, i.e., the instructions are to: receive, by a first computing node of a plurality of computing nodes, a first request to perform a collective operation, the first request indicating a first virtual address and a first data unit to write to a first segment of a memory region; perform a memory allocation process by allocating the memory region based on the first virtual address and determining a descriptor for a physical location of the memory; store, in a data structure, a mapping of the first virtual address to the descriptor; perform the collective operation, the collective operation comprising at least writing the first data unit to the first segment and accessing data units from other segments of the memory region; receive a second request to perform an update operation, the second request indicating a second virtual address, one or more portions of a memory region segment to be updated, and corresponding data units to write to the one or more portions; search a data structure based on the second virtual address to obtain the mapping of the first virtual address to the descriptor, the second virtual address matching the first virtual address; and update, based on the obtained mapping, the one or more portions of the memory region segment by writing the corresponding data units to the one or more portions. The instructions can further perform the operations described herein, including in relation to: the communications in FIGS. 1, 4A-4B, 6A-6B, and 7; the operations depicted in the flowcharts of FIGS. 8A-8B; and the instructions of non-transitory computer-readable storage medium 1000 in FIG. 1000.

In yet another aspect, a non-transitory computer-readable storage medium stores instructions to: receive, by a first computing node, a first request to perform a collective operation, the first request indicating a first virtual address; store, in a data structure, a mapping of the first virtual address to a descriptor for a physical location of a memory region allocated for performance of the collective operation; perform the collective operation, which includes writing a first data unit to a first segment of the memory region and accessing data units from other segments of the memory region; receive a second request to perform an update operation, the second request indicating a second virtual address, one or more portions of a memory region segment to be updated, one or more indices corresponding to the one or more portions, and one or more new values to write to the one or more portions; search a data structure based on the second virtual address to obtain the mapping of the first virtual address to the descriptor, the second virtual address matching the first virtual address; and update, based on the obtained mapping, the one or more portions of the memory region segment by writing the one or more new values to the one or more portions at the indicated one or more indices. The instructions can further perform the operations described herein, including in relation to: the communications in FIGS. 1, 4A-4B, 6A-6B, and 7; the operations depicted in the flowcharts of FIGS. 8A-8B; and the instructions of computer system 900 and content-processing system 918 of FIG. 9.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:
receiving, by a first computing node of a plurality of computing nodes from a processing entity in the first computing node, a first request to perform a collective operation, the first request indicating a first data unit to write to a first segment of a memory region, and the processing entity comprising a rank associated with a program under execution in the computing node;
generating a first virtual address for the memory region;
allocating, to the rank, the memory region based on the first virtual address, the memory region associated with a descriptor for a physical location of the memory;
storing, in a data structure, a mapping of the first virtual address to the descriptor;
performing the collective operation, the collective operation comprising at least writing the first data unit to the first segment and accessing data units from other segments of the memory region;
receiving a second request to perform an update operation, the second request indicating:

a second virtual address;
a number of one or more portions of a memory region segment to be updated;
a list of indices corresponding to the one or more portions of the memory region segment to be updated, wherein a respective index corresponds to an ordered portion of the memory region segment; and
the corresponding data units to write to the one or more portions, wherein a respective corresponding data unit includes a new value to be updated at the corresponding respective index;
performing a first search in the data structure for a mapping of the second virtual address;
identifying, based on the first search, the mapping of the first virtual address to the descriptor in response to the second virtual address matching the first virtual address; and
updating, based on the identified mapping, the one or more portions of the memory region segment by writing the corresponding data units to the one or more portions.

2. The method of claim 1, further comprising:
receiving a third request to perform the collective operation, the third request indicating a third virtual address;
performing a second search in the data structure for the mapping of the third virtual address;
identifying, based on the second search, the mapping of the first virtual address to the descriptor in response to the third virtual address matching the first virtual address; and
performing the collective operation, the collective operation further comprising at least bypassing, based on the identified mapping, writing any data to the memory region and only accessing data units from the memory region.

3. The method of claim 1,
wherein the memory region comprises a network-attached memory.

4. The method of claim 3,
wherein the collective operation is performed by a processor associated with the network-attached memory.

5. The method of claim 1,
wherein the collective operation comprises a Message Passing Interface (MPI) collective operation.

6. The method of claim 1,
wherein indices in the list correspond to a respective data unit to write to a respective portion of the memory region segment.

7. The method of claim 1, further comprising;
receiving, by a second computing node of the plurality of computing nodes, a fourth request to perform the collective operation, the fourth request indicating a second data unit to write to a second segment of the memory region; and
performing the collective operation, the collective operation further comprising at least writing the second data unit to the second segment and accessing at least the first data unit from the first segment of the memory region.

8. A computer system, comprising:
a processor; and
a storage device storing instructions to:
receive, by a first computing node of a plurality of computing nodes from a processing entity in the first computing node, a first request to perform a collective operation, the first request indicating a first virtual address and a first data unit to write to a first segment of a memory region, and the processing entity comprising a rank associated with a program under execution in the computing node;

perform a memory allocation process by allocating, to the rank, the memory region based on the first virtual address and determining a descriptor for a physical location of the memory;

store, in a data structure, a mapping of the first virtual address to the descriptor;

perform the collective operation, the collective operation comprising at least writing the first data unit to the first segment and accessing data units from other segments of the memory region;

receive a second request to perform an update operation, the second request indicating:

a second virtual address;

a number of one or more portions of a memory region segment to be updated;

a list of indices corresponding to the one or more portions of the memory region segment to be updated, wherein a respective index corresponds to an ordered portion of the memory region segment; and the corresponding data units to write to the one or more portions, wherein a respective corresponding data unit includes a new value to be updated at the corresponding respective index;

search a data structure based on the second virtual address to obtain the mapping of the first virtual address to the descriptor, the second virtual address matching the first virtual address; and update, based on the obtained mapping, the one or more portions of the memory region segment by writing the corresponding data units to the one or more portions.

9. The computer system of claim 8, the instructions further to:

receive a third request to perform the collective operation, the third request indicating a third virtual address and received subsequent to performing the collective operation indicated in the first request and the update operation indicated in the second request;

search the data structure based on the third virtual address to obtain the mapping of the first virtual address to the descriptor, the third virtual address matching the first virtual address; and perform the collective operation, the collective operation further comprising at least bypassing, based on the obtained mapping, writing any data to the memory region and only accessing data units from the memory region.

10. The computer system of claim 8, wherein the memory region comprises a network-attached memory.

11. The computer system of claim 10, wherein the collective operation is performed by a processor associated with the network-attached memory.

12. The computer system of claim 8, wherein the collective operation comprises a Message Passing Interface (MPI) collective operation.

13. The computer system of claim 8, the instructions further to:

receive, by a second computing node of the plurality of computing nodes, a fourth request to perform the collective operation, the fourth request indicating a second data unit to write to a second segment of the memory region; and perform the collective operation, the collective operation further comprising at least writing the second data unit to the second segment and accessing at least the first data unit from the first segment of the memory region.

14. A non-transitory computer-readable storage medium storing instructions to:

receive, by a first computing node from a processing entity in the first computing node, a first request to perform a collective operation, the first request indicating a first virtual address, and the processing entity comprising a rank associated with a program under execution in the computing node;

store, in a data structure, a mapping of the first virtual address to a descriptor for a physical location of a memory region allocated for performance of the collective operation;

perform the collective operation, which includes writing a first data unit to a first segment of the memory region and accessing data units from other segments of the memory region;

receive a second request to perform an update operation, the second request indicating:

a second virtual address:

a number of one or more portions of a memory region segment to be updated;

a list of indices corresponding to the one or more portions of the memory region segment to be updated, wherein a respective index corresponds to an ordered portion of the memory region segment; and one or more new values to write to the one or more portions;

search a data structure based on the second virtual address to obtain the mapping of the first virtual address to the descriptor, the second virtual address matching the first virtual address; and update, based on the obtained mapping, the one or more portions of the memory region segment by writing the one or more new values to the one or more portions at the indicated indices.

15. The non-transitory computer-readable storage medium of claim 14, the instructions further to:

subsequent to performing the collective operation indicated in the first request and the update operation indicated in the second request, receive a third request to perform the collective operation, the third request indicating a third virtual address;

search the data structure based on the third virtual address to obtain the mapping of the first virtual address to the descriptor;

determine, based on the obtained mapping, that the third request is a subsequent iteration of the collective operation and that data units associated with the collective operation have been stored and updated in the memory region; and perform, based on the obtained mapping, the collective operation, by bypassing writing any data to the memory region and only reading data units from the memory region.

16. The non-transitory computer-readable storage medium of claim 14, the memory region comprising a network-attached memory,

the network attached memory associated with a processor which performs the collective operation, and the collective operation comprising a Message Passing Interface (MPI) collective operation.

17. The non-transitory computer-readable storage medium of claim 16, the network-attached memory and the associated processor comprising a memory server which performs computations offloaded by the first computing node.

18. The non-transitory computer-readable storage medium of claim 14, the first request indicating the first data unit to write to the first segment of a memory region, and the instructions further to:

receive, by a second computing node, a fourth request to perform the collective operation, the fourth request indicating a second data unit to write to a second segment of the memory region; and perform the collective operation, the collective operation further comprising at least writing the second data unit to the second segment and accessing at least the first data unit from the first segment of the memory region.

\* \* \* \* \*

24